(12) United States Patent
Wakamiya

(10) Patent No.: US 7,554,753 B2
(45) Date of Patent: Jun. 30, 2009

(54) FISH-EYE LENS AND IMAGING DEVICE

(75) Inventor: Koichi Wakamiya, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/153,982

(22) Filed: May 28, 2008

(65) Prior Publication Data

US 2008/0278826 A1    Nov. 13, 2008

Related U.S. Application Data

(63) Continuation of application No. PCT/JP2006/323800, filed on Nov. 29, 2006.

(30) Foreign Application Priority Data

Dec. 2, 2005  (JP)  ............................. 2005-349081
Dec. 2, 2005  (JP)  ............................. 2005-349082

(51) Int. Cl.
*G02B 13/04* (2006.01)
*G02B 13/18* (2006.01)
*G02B 9/52* (2006.01)

(52) U.S. Cl. ...................... 359/752; 359/708; 359/713; 359/756

(58) Field of Classification Search ......... 359/749–753, 359/708, 713, 756
See application file for complete search history.

(56) References Cited

U.S. PATENT DOCUMENTS

| | | | |
|---|---|---|---|
| 4,256,373 | A | 3/1981 | Horimoto |
| 5,434,713 | A | 7/1995 | Sato |
| 5,477,389 | A | 12/1995 | Ito et al. |
| 5,666,228 | A | 9/1997 | Yamamoto |
| 5,724,195 | A | 3/1998 | Enomoto et al. |
| 6,128,145 | A | 10/2000 | Nagaoka |
| 6,844,991 | B2 * | 1/2005 | Mizuguchi ................. 359/749 |
| 2004/0021958 | A1 | 2/2004 | Mizuguchi |
| 2004/0179263 | A1 | 9/2004 | Yoshikawa et al. |

FOREIGN PATENT DOCUMENTS

| | | |
|---|---|---|
| JP | 54-32319 | 3/1979 |
| JP | A-60-153018 | 8/1985 |
| JP | A-02-014684 | 1/1990 |
| JP | A-10-142498 | 5/1998 |
| JP | A-2000-356739 | 12/2000 |
| JP | A-2003-167195 | 6/2003 |
| JP | A-2004-126522 | 4/2004 |
| JP | A-2004-226928 | 8/2004 |
| JP | A-2004-354572 | 12/2004 |
| JP | A-2005-309058 | 11/2005 |
| JP | A-2005-311758 | 11/2005 |

* cited by examiner

*Primary Examiner*—William C Choi
*Assistant Examiner*—Jack Dinh
(74) *Attorney, Agent, or Firm*—Oliff & Berridge, PLC

(57) ABSTRACT

A fisheye lens, comprising a front group made up of a total of three groups, which are two concave lenses 1 and 2 whose concave surfaces are directed toward the image side, and a compound lens 3 whose concave surface is directed toward the image side and which has an overall convex or concave refractive power; and a rear group formed by three groups of convex lenses 4, 5, and 6, wherein the front group includes at least one compound lens set, the rear group includes one compound lens set, and at least a first surface of a first concave lens 1 of the front group is an aspheric surface, and satisfies specific conditions. As a result, it is possible to obtain a fisheye lens that can realize a foveal optical system with undiminished illuminance all the way to the periphery and with high resolution over the entire field of view, and with which a wide field of view and an extremely compact size can be attained with a single wide-angle optical system.

20 Claims, 20 Drawing Sheets

FISH-EYE LENS AND IMAGING DEVICE

This is a continuation of PCT International Application No. PCT/JP2006/323800 filed on Nov. 29, 2006, which is hereby incorporated by reference.

TECHNICAL FIELD

The present invention relates to a fisheye lens and an imaging device that makes use of the same.

BACKGROUND ART

A foveal optical system is an optical system that mimics the function of the human eye, and is an optical system with an extremely wide field of view, and that affords high resolution if we focus on the center part of the field. Optical systems such as this have been described, for example, in Japanese Laid-Open Patent Applications 2004-354572 and 2000-221391.

[Patent Document 1] Japanese Laid-Open Patent Application 2004-354572

[Patent Document 2] Japanese Laid-Open Patent Application 2000-221391

[Patent Document 3] Japanese Laid-Open Patent Application 2003-167195

DISCLOSURE OF THE INVENTION

Problems to be Solved by the Invention

Many different proposals have been made for optical systems similar to the function of a foveal optical system. With a multiple optical system that combines a wide-angle lens with a telephoto lens having a narrow angle of view, critical drawbacks are the complexity of the system and a bulkier size. If this is realized with a twin-lens optical system, parallax with the subject becomes a problem.

The use of a zoom lens is also conceivable, but it is difficult to satisfy a wide field of view and high resolution at the same time. A characteristic of zooming is that it takes time, and only either a wide-angle image or a telephoto image can be confirmed instantly, which is a problem. Another major drawback is that the lens inevitably becomes longer and bulkier in general.

A catadioptric system has also been proposed in Japanese Laid-Open Patent Application 2003-167195. However, with a catadioptric system, there is a blind spot in the center, which is the most important spot in the field of view, and only a doughnut-shaped field can be observed. Furthermore, precise machining is generally difficult, and high resolution cannot be obtained. A creative attempt is made to handle this by making the center part of the catadioptric system transmissive and enlarging only the center part of the image. However, this makes the wide-angle and telephoto images discontinuous, so that the system is extremely difficult to use when put together.

A method for realizing a foveal optical system with a single wide-angle optical system is described in Japanese Laid-Open Patent Application 2004-354572. This optical system involves a lens which is such that image distortion is reduced in the center part of the field of view, and negative barrel-shaped distortion aberration occurs moving closer to the circumferential edges. However, even with this foveal lens, the field of view is not widened to about 180 degrees, and distortion is given so much priority that resolution may become partially insufficient, or another characteristic that is important to the eye, namely, that the field of view be as uniform as possible all the way to the periphery or that sensitivity be higher, may be neglected, which leads to a problem in that the lens ends up having a field of view that is dark at the periphery and that is therefore essentially even narrower.

The present invention was devised in light of such circumstances, and it is an object of the present invention to provide a fisheye lens that makes it possible to realize a foveal optical system with undiminished illuminance all the way to the periphery and with high resolution over the entire field of view, and with which a wide field of view and an extremely compact size can be attained with a single wide-angle optical system, and to provide an imaging device in which this fisheye lens is used.

Means for Solving the Problems

The first means used to solve the problems described above is a fisheye lens with an angle of incidence of at least 60 degrees, comprising a front group made up of a total of three groups, which are, in order from the object side, two concave lenses whose concave surfaces are directed toward the image side, and a compound lens whose concave surface is directed toward the image side and which has an overall convex or concave refractive power; and a rear group formed by three groups of convex lenses, wherein the front group includes at least one compound lens set, the rear group includes only one compound lens set, and at least a first surface of a first concave lens of the front group is an aspheric surface, and satisfies the following conditions:

(1) The aspheric first surface of the first concave lens of the front group either is expressed by the formula X=G(Y), where the origin is the apex of the aspheric surface, X is the optical axis direction, and Y is a direction perpendicular to the optical axis (a positive value), or is expressed as a functional approximation by the formula dx/dY>0 within the range of $Y_{max}$>Y>0.5f, where $Y_{max}$ is the maximum value of the effective radius of the lens, and f is the focal distance of the lens system overall.

(2) When the projection function of the lens is taken using h=f*sin ω as a reference scale, the distortion aberration V when the incidence angle ω is 60 degrees is such that −10%≧V≧−16%. Here, V=(H−h)*100/h (%), and H represents the height of the image from the optical axis when the incidence angle ω is 60 degrees.

Incidentally, the lens numbers and surface numbers are counted in order from the object side in this specification and in the claims.

The second means used to solve the problems described above is the first means, wherein the above-mentioned G(Y) is expressed by the following formula:

[Mathematical Formula 1]

$$G(Y) = \frac{(1/R1)Y^2}{1+\sqrt{1-\kappa\left(\frac{Y}{R1}\right)^2}} + \sum_{i=1}^{N} K_i Y^{a_i}$$

The type of aspheric surface here is a rotational aspheric surface whose center of rotation is around the optical axis. Furthermore, R1 is the radius of curvature of the first surface of the first concave lens, κ and $K_i$ are constants, N is a natural number, and $a_i$ is an integer or a real number greater than 1.

The third means used to solve the problems described above is the second means, wherein the above-mentioned G(Y) is expressed by the following formula:

[Mathematical Formula 2]

$$G(Y) = \frac{(1/R1)Y^2}{1+\sqrt{1-\kappa\left(\frac{Y}{R1}\right)^2}} + AY^4 + BY^6 + CY^8 + DY^{10} + EY^{12} + FY^{14}\ldots \quad (1)$$

The type of aspheric surface here is a rotational aspheric surface whose center of rotation is around the optical axis. Furthermore, R1 is the radius of curvature of the first surface of the first concave lens, and κ, A, B, C, D, E, and F are constants.

The three groups of lenses of the front group have the function of converting incident light rays from a wide incidence angle a little at a time to a small angle along the optical axis, and causing the rays to pass a diaphragm position. Moreover, the larger is the incidence angle of the light rays, the closer to the edge of the lens the light rays will pass. Therefore, in order to minimize the meridional image field curvature that occurs in the positive direction, all the lenses must have their concave surfaces directed toward the image side, and at least the lens located closest to the object side preferably has a meniscus shape because of its particularly large incidence angle.

It is necessary to use three groups of lenses for the front group in order to prevent the sudden occurrence of meridional image field curvature and to prevent inconsistency in the location where the image field curvature occurs with respect to the image height. The fewer the lenses, the greater the inconsistency from place to place, but if there are too many lenses, the size will be too large. Placing at least one compound lens set in the front group is absolutely essential for correcting both chromatic aberration of magnification and axial chromatic aberration, in combination with the compound lens of the rear group.

Single lens havv dispersion of colors, so that positive axial chromatic aberration and negative lateral chromatic aberration occur in relation to light of a shorter wavelength in the concave lenses of the front group. Meanwhile, in cases where convex single lenses are disposed in the rear group, the action of just the rear group will cause negative axial chromatic aberration and negative magnification chromatic aberration to occur in relation to light of a shorter wavelength. Therefore, if we assume that the front group and rear group are made up of just single lenses, the signs for the axial chromatic aberration will be opposite of each other, so that the axial chromatic aberration can be canceled and corrected. However, the magnification chromatic aberration will be negative, and cannot be corrected. The fact that the rear group has a negative refractive power component of relatively large dispersion is effective at correcting chromatic aberration, and is a necessary condition, but this alone cannot completely correct axial chromatic aberration and magnification chromatic aberration in a balanced way, and a component having a positive refractive power of relatively large dispersion is always necessary in the front group as well. The incidence angle of the light rays passing through the edge of the lens is slightly different for each wavelength between the first lens group and the second lens group, and for this reason, it is desirable to minimize dispersion at the outer periphery of the field of view of the image field to prevent coloring; therefore, a compound type of achromatic lens is also effective. In concrete terms, the first lens group and second lens group preferably both have an Abbe number vd that is greater than 55.

An aspheric surface is mainly used to obtain the negative distortion aberration characteristics of a foveal lens, but the place that has the least effect on spherical aberration is the one farthest away from the diaphragm, that is, the first surface of the first concave lens. It is possible to use an aspheric surface for a plurality of surfaces, but spherical aberration, meridional image field curvature, and distortion aberration cannot be corrected in a balanced fashion unless at least the first surface of the first concave lens is an aspheric surface.

The reason for lining up three groups of positive lenses in the rear group is that if there are two or fewer, it will be impossible to correct various higher-order aberrations originating in the fact that each lens is burdened with too much refractive power, and especially the negative spherical aberration and the image field curvature aberration that quickly increases near the periphery of the field of view. What is even more important is that in order to satisfy a telecentric optical system, in relation to just the rear group, the area near the focal location when performing reverse ray tracing from the image side is the diaphragm location, and the spherical aberration thereof must not be very large. In the case of this lens, if we let fB be the combined focal distance of the three groups in the rear group, it is desirable that fB be such that about 1.2f<fB<1.5f. In this case, however, within this combined focal distance range, the F number when performing reverse ray tracing is about 0.7, which is extremely bright, and at least three groups of convex lenses are necessary from the standpoint of minimizing spherical aberration as well. If four or more groups of lenses are lined up, spherical aberration will be reduced, but the thickness of the lenses will be too large, the back focus on the front side of the rear group will be negative, and the optical system will not be telecentric. As a result, the rear group comprises three groups of positive lenses.

With regard to the rear group, it was discussed above that concave lenses are required for the rear group in order to correct chromatic aberration, and study involving the use of a single concave lens was pursued to avoid making the compound lens thicker, thus preventing the back focus on the front side of the rear group from becoming negative, which would cause a loss of telecentricity. The reasons for making the concave lens a compound lens were to avoid the generation of ghost at the boundary with air, and to prevent the diaphragm location from being too close to the lenses of the rear group and interfering due to the increased thickness of the rear group resulting from providing an air gap. As a result, it was found that as long as the system has this foveal characteristic, aberration can be corrected well by using just one group of compound lens for the rear group.

In this means, the front group has concave refractive power, and the rear group has convex refractive power, which belongs to a so-called retrofocus type. With a retrofocus type lens, it is generally expected that the amount of peripheral light will be maintained, and curvature of the image field will tend not to be large for a wide field of view. Negative distortion aberration occurs in both the front group and the rear group because a construction is used in which negative lenses are disposed on the object side (referred to as the front group), positive lenses are disposed on the image side (referred to as the rear group), and the chief rays cross the optical axis between the front group and the rear group. As a result, a strong negative distortion aberration is obtained for the entire lens system.

However, experience tells us that a distortion aberration amount obtained in this way generally has a projection function close to y=f*ω. The required specifications are distortion characteristics which are such that negative distortion aberration is small within a range of a small incidence angle, and that negative distortion aberration is extremely large within a range of a large incidence angle. In order to realize this, an approach must be taken in which an optical layout that still has insufficient negative distortion aberration is used as basic data, and the tendency toward distortion of light rays with a large incidence angle, which mainly pass through the circumferential edges of the lens, is made more pronounced.

In concrete terms, one means is to use aspheric lenses for the front group and the rear group. In the front group, an aspheric surface is used which has the effect of strengthening the refractive action of a concave lens such that light rays with a large incidence angle at the circumferential edges of the lens will be guided into the lens, while in the rear group, conversely, an aspheric surface is used which strengthens the convergence action as much as possible at the lens periphery in order to lower the image height of the light rays clustered at a certain image height after passing through the diaphragm location. When ray tracing was actually performed in various ways, a number of side effects occurred.

The first side effect is that the telecentricity of the lens breaks down. In particular, in cases where the positive refractive power is increased at the circumferential edges of the rear-group lenses, the imaging light rays are converged at the periphery of the screen. As a result, an image is formed such that even though the chief rays out of the light rays clustered toward the inside within the screen are disposed in a somewhat divergent fashion, the chief rays out of the light rays clustered toward the outside of the screen are converged.

Specifically, telecentricity breaks down, and depending on the location, the direction in which the chief rays advance may be convergent or divergent. Two problems are encountered as a result. The first is that compatibility with electronic imaging elements becomes poor, and sensitivity is uneven. Electronic imaging elements have high sensitivity to light rays that are vertically incident, and the sensitivity decreases to light rays that are incident at an angle, so that if telecentricity breaks down, the result is uneven sensitivity.

The second problem is that in cases where a lens is actually used and there is a focusing error, it is possible that the distortion of the image will vary in a complex fashion. This is very likely to cause trouble when information about the object side is obtained from the result of location measurement within the image even if there is no significant effect that is visible in the image.

The result of the above investigation is that no aspheric surface is used to increase distortion in the rear group. This does not exclude, however, the use of an aspheric surface for correcting spherical aberration, coma aberration, or other such aberration or reducing the number of lenses.

The second side effect is that the aperture ratio of peripheral light worsens, and there is a reduction in peripheral light. Especially in the front group, the chief rays out of the light rays with a large incidence angle that are incident on the fisheye lens proceed through the area near the edges of a plurality of lenses having a wedge angle, but just as if passing through a prism spectroscope, thin parallel light rays proceed while gradually decreasing in incidence angle, and pass through the optical axis at the aperture.stop. The wedge angle of this prism must be further increased in order to particularly increase the negative distortion of light rays with a large incidence angle. Eventually, however, the face of the first surface of the lens comes into contact with the incident light rays, so that there is a limit in terms of optical layout. This is because in cases where the light rays come into contact with the first surface, the cross-sectional area of the incident light flux that can pass through the diaphragm drops to zero, and there is therefore theoretically no peripheral light that is incident on the lens.

The first surface of the first lens is made an aspheric surface to the extent that these side effects do not exceed the limits of the required specifications. Making a plurality of surfaces into an aspheric surface was also attempted, but the reduction of light flux with a large incident angle could not avoid, and it was found that a wide incident angle could not be maintained; therefore, just one surface was made aspheric in the end. Then, the first surface of the first lens is formed according to Formula (1), which is the typical shape for a spherical lens.

The restrictions of conditions (1) are extremely useful conditions. In cases where dx/dY>0 is not satisfied within the range of $Y_{max}$>Y>0.5f, there is a sharp drop in the amount of light incident on the lens at an angle of view with an incidence angle of 60 degrees or more, and as a result, no matter how the lens projects, there is still not enough illuminance at the periphery. In cases where Y is 0.5f or less, only light rays with a relatively small incidence angle participate, so that these light rays contribute almost nothing to the insufficient illuminance due to this reason. Therefore, the restriction of dx/dY>0 is unnecessary.

The second conditions (2) will be described. A projection style of H=f*sin ω is known as a lens having uniform illuminance. This style applies to an ideal situation in which no light loss is included due to the internal transmissivity of the lens or to reflection at the various surfaces of the lens, nor any loss of cross-sectional area of the incident light flux. In actuality, the effect of these is accompanied by reduced peripheral light.

In order to suppress this effect to a minimum, it is preferable to have further negative distortion aberration with respect to the projection style of H=f*sin ω, and the range of conditions (2) must be preserved to maintain illuminance. In cases where the value of V exceeds −10%, it is true that the reduction in the amount of peripheral light due to the projection function characteristics at an incidence angle ω of 60° toward 0% is not a bad tendency. However, if ω>60° to obtain foveal characteristics, imparting more negative distortion characteristics makes the incident light flux narrow suddenly; therefore, there is not enough peripheral light. That is, the tendency for the amount of peripheral light to be somewhat insufficient cannot be eliminated.

In cases where the value of V becomes less than −16%, the projection function will tend to further increase the amount of peripheral light, but the light flux incident on the lens will narrow suddenly, so that once again, there will be insufficient illuminance of the image field at the periphery. In the end, there is no insufficiency in the image field illuminance at the periphery in cases where the distortion aberration amount V at ω=60 degrees is such that −10%≧V≧−16%.

The fourth means used to solve the problems described above is any of the first through third means, wherein (3) and (4) below are satisfied:

(3) If we let the focal distance of the front group be fF, −0.8f>fF>−1.5f.

(4) If we let the back focus on the front side of the rear group be BFr, 0<BFr<0.2f.

Under the conditions of (3), if the value of fF is −0.8f or greater, the concave power will be too strong, the Petzval sum will be too negative, image field curvature will become positive, and the image at the periphery will blur. Furthermore, if the value of fF is −1.5f or less, the back focus will be too short, and dimensional restrictions will make it difficult to actually realize an optical system.

The conditions of (4) are necessary conditions for realizing a good telecentric optical system. The light rays emitted at the back-focus position on the front side of the rear group are, of course, parallel light. In cases where the diaphragm is placed between the front group and the rear group, or in cases where the chief rays of peripheral light pass through the optical axis, it is essential that BFr>0. If BFr is 0 or less, the optical system will not be telecentric, but rather a divergent system. If BFr is greater than 0.2f, the optical system will not be telecentric due to restriction of the space in between the front group and rear group, and will be a convergent system instead.

The fifth means used to solve the problems described above is any of the first through fourth means, wherein the second convex lens of the rear group is a cemented lens consisting of three lenses, which are convex, concave, and convex, in that order from the object side, and the compound concave lens in the middle is a lens made of a transmissive member with a higher refractive index and higher dispersion than the compound convex lens on the image side.

The reason for this is to give the rear group the function of a concave lens having the divergence action, and to this end, the refractive index of the concave lens is set higher than that of the convex lens, thus correcting the negative spherical aberration of the rear group. When the spherical aberration of the rear group is corrected, the chief rays passing through the (aperture) diaphragm become parallel before reaching the image field, and this improves the telecentricity on the image side. Telecentricity on the image side cannot be maintained in cases where the refractive index of the concave lens is lower than that of the convex lens. The reason for using a high-dispersion member as the member for the convex lens is to ameliorate chromatic aberration, and particularly magnification chromatic aberration.

The sixth means used to solve the problems described above is the fifth means, wherein the second convex lens of the rear group is a cemented lens consisting of three lenses, which are convex, concave, and convex, in that order from the object side, and if we let f ou be the focal distance of the concave lens, the following relationship is satisfied:

$$-1.2f < f\,ou < -0.9f \qquad (5)$$

In cases where f ou is −1.2f or less, the action of the concave lens is inadequate, and the spherical aberration of the entire system becomes negative, and cannot be corrected. In cases where f ou is −0.9f or greater, the divergence action becomes too strong, so that the meridional image field curvature becomes positive; furthermore, coma aberration becomes large, particularly on the upper side, and this worsens the aberration balance.

The seventh means used to solve the problems described above is an imaging device that has the fisheye lens of any of the first through sixth means, has the function of acquiring an image with an electronic imaging device, further has at least one mechanism out of a pan mechanism, a tilt mechanism, and a rotation mechanism, and can be operated by electrical signals or dynamically.

With a foveal optical system, there is a distribution to the ability to observe a subject narrowly, and resolution is higher in the center of the field of view, so that there are cases in which it is desirable to make use of a pan mechanism, a tilt mechanism, or a rotation mechanism, as needed, to capture a target object in the center of the field of view. This lens has an extremely wide angle, and has high resolution and is bright all the way to the periphery, so that a combination of a pan mechanism, a tilt mechanism, and a rotation mechanism is more effective than a conventional optical system. Furthermore, a combination of a pan mechanism, a tilt mechanism, and a rotation mechanism can be realized by suitable application of universally known technology.

The eighth means used to solve the problems described above is an imaging device that has the fisheye lens of any of the first through sixth means, is equipped with an electronic imaging device, and further has the function of recording or storing at least one of a captured image, the time, the direction, and the device's own coordinates, the function of identifying a subject, and the function of directing a target close to the center of the field of view according to an internal or external signal.

With a foveal optical system having the extremely wide angle of this lens, there is a distribution to the ability to observe a subject narrowly, and resolution is higher in the center of the field of view. Therefore, in cases where a pan mechanism, a tilt mechanism, or a rotation mechanism is used, as needed, to capture a target object in the center of the field of view, the possibility of identifying a subject is further enhanced, from the periphery to the center. The suitability of this photographic lens can be taken advantage of to be more completely successful at directing a target close to the center of the field of view. Furthermore, the function of recording or storing at least one of a captured image, the time, the direction, and the device's own coordinates, the function of identifying a subject, and the function of directing a target close to the center of the field of view according to an internal or external signal can be realized by suitable application of universally known technology in each case.

The ninth means used to solve the problems described above is an imaging device that makes use of a plurality of fisheye lenses having the same specifications as the fisheye lens of any of the first through sixth means, wherein parallax can be utilized to acquire distance information about at least a specific place.

A general tendency of wide-angle lenses is that they do not capture parallax well, but a foveal optical system is better at capturing parallax because the focal distance of the center part is relatively long. It is particularly advantageous to use the lens of the present invention for acquiring distance information for at least a specific place by using parallax.

The tenth means used to solve the problems described above is an imaging device that makes use of a plurality of the fisheye lenses of any of the first through sixth means, wherein a multi-lens has a convergence mechanism.

The eleventh means used to solve the problems described above is a fisheye lens with an angle of incidence of at least 60 degrees, comprising a front group made up of a total of three groups, which are, in order from the object side, two concave lenses whose concave surfaces are directed toward the image side, and a compound lens whose concave surface is directed toward the image side and which has an overall convex or concave refractive power; and a rear group formed by three groups of convex lenses, wherein the front group includes at least one compound lens set, the rear group includes two or more compound lens sets, and at least a first surface of a first concave lens of the front group is an aspheric surface, and satisfies the following conditions:

(6) The aspheric first surface of the first concave lens of the front group either is expressed by the formula X=G(Y), where the origin is the apex of the aspheric surface, X is the optical axis direction, and Y is a direction perpendicular to the optical axis (a positive value), or is expressed as a functional approximation by the formula dx/dY>0 within the range of $Y_{max} > Y > 0.5f$, where $Y_{max}$ is the maximum value of the effective radius of the lens, and f is the focal distance of the lens system overall.

(7) When the projection function of the lens is taken using h=f*sin ω as a reference scale, the distortion aberration V when the incidence angle ω is 60 degrees is such that −10%≧V≧−16%.

Here, V=(H−h)*100/h (%), and H represents the height of the image from the optical axis when the incidence angle ω is 60 degrees.

The twelfth means used to solve the problems described above is the eleventh means, wherein the above-mentioned G(Y) is expressed by the following formula:

[Mathematical Formula 3]

$$G(Y) = \frac{(1/R1)Y^2}{1 + \sqrt{1 - \kappa\left(\frac{Y}{R1}\right)^2}} + \sum_{i=1}^{N} K_i Y^{a_i}$$

The type of aspheric surface here is a rotational aspheric surface whose center of rotation is around the optical axis. Furthermore, R1 is the radius of curvature of the first surface of the first concave lens, κ and $K_i$ are constants, N is a natural number, and $a_i$ is an integer or a real number greater than 1.

The thirteenth means used to solve the problems described above is the eleventh means, wherein the above-mentioned G(Y) is expressed by the following formula:

[Mathematical Formula 4]

$$G(Y) = \frac{(1/R1)Y^2}{1 + \sqrt{1 - \kappa\left(\frac{Y}{R1}\right)^2}} + AY^4 + BY^6 + CY^8 + DY^{10} + EY^{12} + FY^{14}\ldots \quad (2)$$

The type of aspheric surface here is a rotational aspheric surface whose center of rotation is around the optical axis. Furthermore, R1 is the radius of curvature of the first surface of the first concave lens, and κ, A, B, C, D, E, and F are constants.

The three groups of lenses of the front group have the function of converting incident light rays from a wide incidence angle a little at a time to a small angle along the optical axis, and causing the rays to pass a diaphragm position. Moreover, the larger is the incidence angle of the light rays, the closer to the edge of the lens the light rays will pass. Therefore, in order to minimize the meridional image field curvature that occurs in the positive direction, all the lenses must have their concave surfaces directed toward the image side, and at least the lens located closest to the object side preferably has a meniscus shape because of its particularly large incidence angle.

It is necessary to use three groups of lenses for the front group in order to prevent the sudden occurrence of meridional image field curvature and to prevent inconsistency in the location where the image field curvature occurs with respect to the image height. The fewer the lenses, the greater the inconsistency from place to place, but if there are too many lenses, the size will be too large.

Placing at least one compound lens set in the front group is absolutely essential for correcting both chromatic aberration of magnification and axial chromatic aberration, in combination with the compound lens of the rear group. A single lens has dispersion of all colors, so that positive axial chromatic aberration and negative magnification chromatic aberration occur in relation to light of a shorter wavelength in the concave lenses of the front group. Meanwhile, in cases where only convex single lenses are disposed in the rear group, the action of just the rear group will cause negative axial chromatic aberration and negative magnification chromatic aberration to occur in relation to light of a shorter wavelength. Therefore, if we assume that the front group and rear group are made up of just single lenses, the signs for the axial chromatic aberration will be opposite of each other, so that the axial chromatic aberration can be canceled and corrected. However, the magnification chromatic aberration will be negative, and cannot be corrected.

The fact that the rear group has a negative refractive power component of relatively large dispersion is effective at correcting chromatic aberration, and is a necessary condition, but this alone cannot correct axial chromatic aberration and magnification chromatic aberration in a balanced way, and a component having a positive refractive power of relatively large dispersion is always necessary in the front group as well. The incidence angle of the light rays passing through the edge of the lens is slightly different for each wavelength between the first lens group and the second lens group, and for this reason, it is desirable to minimize dispersion at the outer periphery of the field of view of the image field to prevent coloring; therefore, a compound type of achromatic lens is also effective. In concrete terms, the first lens group and second lens group preferably both have an Abbe number vd that is greater than 55.

An aspheric surface is mainly used to obtain the negative distortion aberration characteristics of a foveal lens, but the place that has the least effect on spherical aberration is the one farthest away from the diaphragm, that is, the first surface of the first concave lens. It is possible to use an aspheric surface for a plurality of surfaces, but spherical aberration, meridional image field curvature, and distortion aberration cannot be corrected in a balanced fashion unless at least the first surface of the first concave lens is an aspheric surface.

The reason for lining up three groups of positive lenses in the rear group is that if there are two or fewer, it will be impossible to correct various higher-order aberrations originating in the fact that each lens is burdened with too much refractive power, and especially the negative spherical aberration and the image field curvature aberration that quickly increases near the periphery of the field of view. What is even more important is that in order to satisfy a telecentric optical system, in relation to just the rear group, the area near the focal location when performing reverse ray tracing from the image side is the diaphragm location, and the spherical aberration thereof must not be very large. In the case of this lens, if we let fB be the combined focal distance of the three groups of the rear group, it is desirable that fB be such that about 1.2f<fB<1.5f. However, within the combined focal distance range, the F number when performing reverse ray tracing is about 0.7, which is extremely bright, and at least three groups of convex lenses are necessary from the standpoint of minimizing spherical aberration. If four or more groups of lenses are lined up, spherical aberration will be reduced, but the thickness of the lenses will be too large, the back focus on the front side of the rear group will be negative, and the optical system will not be telecentric, so that the rear group ends up being three groups of positive lenses.

With regard to the rear group, it was discussed above that concave lenses are required for the rear group in order to correct chromatic aberration, and study involving the use of a single concave lens was conducted; as a result, it was found that chromatic aberration, spherical aberration, and coma aberration could be favorably corrected by making the concave lenses biconcave lenses. However, the surface of a biconcave lens on the image side would be a concave surface with a somewhat larger radius of curvature with respect to the image field, and it was found that reflection between this concave surface and the surface of a filter or other parallel plane member on the image side returns to the imaging field, resulting in flare.

In view of this, the balance between the various aberrations was readjusted by increasing the number of compound lenses; consequently, it was possible to somewhat decrease the radius of curvature of this concave surface, and to reduce the corresponding flare. As a result of this investigation, it was found that as long as these foveal characteristics are in effect, a lens with good aberration correction and little flare can be realized by using at least two groups of compound lenses for the rear group.

In this means, the front group has concave refractive power, and the rear group has convex refractive power, which belongs to a so-called retrofocus type. With a retrofocus type lens, it is generally expected that the amount of peripheral light will be maintained, and curvature of the image field will tend not to be large for a wide field of view. Negative distortion aberration occurs in both the front group and the rear group because a construction is used in which negative lenses are disposed on the object side (referred to as the front group), positive lenses are disposed on the image side (referred to as the rear group), and the chief rays cross the optical axis between the front group and the rear group. As a result, a strong negative distortion aberration is obtained for the entire lens system.

However, experience tells us that a distortion aberration amount obtained in this way generally has a projection function close to $y=f*\omega$. The required specifications are distortion characteristics which are such that negative distortion aberration is small within a range of a small incidence angle, and that negative distortion aberration is extremely large within a range of a large incidence angle. In order to realize this, an approach must be taken in which an optical layout that still has insufficient negative distortion aberration is used as basic data, and the tendency toward distortion of light rays with a large incidence angle, which mainly pass through the circumferential edges of the lens, is made more pronounced.

In concrete terms, one means is to use aspheric lenses for the front group and the rear group. In the front group, an aspheric surface is used which has the effect of strengthening the refractive action of a concave lens such that light rays with a large incidence angle at the circumferential edges of the lens will be guided into the lens, while in the rear group, conversely, an aspheric surface is used which strengthens the convergence action as much as possible at the lens periphery in order to lower the image height of the light rays clustered at a certain image height after passing through the diaphragm location. When ray tracing was actually performed in various ways, a number of side effects occurred.

The first side effect is that the telecentricity of the lens breaks down. In cases where the positive refractive power is increased at the circumferential edges of the lenses of the rear group, in particular, the imaging light rays are converged at the periphery of the screen. As a result, an image is formed such that even though the chief rays out of the light rays clustered toward the inside within the screen are disposed in a somewhat divergent fashion, the chief rays out of the light rays clustered toward the outside of the screen are converged.

Specifically, telecentricity breaks down, and depending on the location, the direction in which the chief rays advance may be convergent or divergent. Two problems are encountered as a result. The first is that compatibility with electronic imaging elements becomes poor, and sensitivity is uneven. Electronic imaging elements have high sensitivity to light rays that are vertically incident, and the sensitivity decreases to light rays that are incident at an angle, so that if telecentricity breaks down, the result is uneven sensitivity.

The second problem is that in cases where a lens is actually used and there is a focusing error, it is possible that the distortion of the image will vary in a complex fashion. This is very likely to cause trouble when information about the object side is obtained from the result of location measurement within the image even if there is no significant effect that is visible in the image.

The result of the above investigation is that no aspheric surface is used to increase distortion in the rear group. This does not exclude, however, the use of an aspheric surface for correcting spherical aberration, coma aberration, or other such aberration or reducing the number of lenses.

The second side effect is that the aperture ratio of peripheral light worsens, and there is a reduction in peripheral light. Especially in the front group, the chief rays out of the light rays with a large incidence angle that are incident on the fisheye lens proceed through the area near the edges of a plurality of lenses having a wedge angle, but just as if passing through a prism spectroscope, slender parallel light rays proceed while gradually decreasing in incidence angle, and pass through the optical axis at the diaphragm location. The apex of this prism must be further increased in order to particularly increase the negative distortion of light rays with a large incidence angle. Eventually, however, the surface of the first surface of the lens comes into contact with the incident light rays, so that there is a limit in terms of optical layout. This is because in cases where the light rays come into contact with the first surface, the cross-sectional area of the incident light flux that can pass through the diaphragm drops to zero, and there is therefore theoretically no peripheral light that is incident on the lens.

The first surface of the first lens is made an aspheric surface to the extent that these side effects do not exceed the limits of the required specifications. Making two or more surfaces into an aspheric surface was also attempted, but the amount of incident light of light rays with a large incidence angle just started decreasing from a smaller angle, and it was found that a wide incidence angle could not be maintained; therefore, just one surface was made aspheric in the end. Then, the first surface of the first lens is formed according to Formula (2), which is the typical shape for an aspheric lens.

The restrictions of conditions (6) are extremely useful conditions. In cases where $dx/dY>0$ is not satisfied within the range of $Y_{max}>Y>0.5f$, there is a sharp drop in the amount of light incident on the lens at an angle of view with an incidence angle of 60 degrees or more, and as a result, no matter how the lens projects, there is still not enough illuminance at the periphery. In cases where Y is 0.5f or less, only light rays with a relatively small incidence angle participate, so that these light rays contribute almost nothing to the insufficient illuminance due to this reason. Therefore, the restriction of $dx/dY>0$ is unnecessary.

The seventh conditions (7) will be described. A projection style of $H=f*\sin\omega$ is known as a lens having uniform illuminance. This style applies to an ideal situation in which no light loss is included due to the internal transmissivity of the lens or to reflection at the various surfaces of the lens, nor any loss of cross-sectional area of the incident light flux. In actuality, the effect of these is accompanied by reduced peripheral light.

In order to keep this effect to a minimum, it is preferable to have further negative distortion aberration with respect to the projection style of H=f*sin ω, and the range of conditions (7) must be preserved to maintain illuminance. In cases where the value of V exceeds −10%, it is true that the reduction in the amount of peripheral light due to the projection function at an incidence angle ω of 60° toward 0% is not a bad tendency. However, if ω>60° to obtain foveal characteristics, imparting more negative distortion characteristics suddenly makes the incident light flux narrow, and there is not a sufficient amount of peripheral light. That is, the tendency for the amount of peripheral light to be somewhat insufficient cannot be eliminated. In cases where the value of V becomes less than −16%, the projection function will tend to further increase the amount of peripheral light, but the light flux incident on the lens will narrow suddenly. Therefore, once again there will be insufficient illuminance of the image field at the periphery. In the end, the image field illuminance is insufficient at the periphery in cases where the distortion aberration amount V at ω=60 degrees is such that −10%≧V≧−16%.

The fourteenth means used to solve the problems described above is any of the eleventh through thirteenth means, wherein (8) and (9) below are satisfied:

(8) If we let the focal distance of the front group be fF, −0.8f>fF >−1.5f.

(9) The radius of curvature R of the compound surface of the second-group convex lens of the rear group is such that 1.0f<R<1.4f.

Under the conditions of (8), if the value of fF is −0.8f or greater, the concave power will be too strong, and the Petzval sum will be too negative. Furthermore, if the value of fF is −1.5f or less, the back focus will be too short, and dimensional restrictions will make it difficult to actually realize an optical system.

The conditions of (9) are conditions that prevent the occurrence of harmful ghost. There are cases in which return light from the CCD surface of a camera, or from a parallel plane member located on the back surface of a lens is reflected by the compound surface of a concave surface, and returns to the CCD surface. These conditions are meant to prevent this. If the value of R is 1.4f or greater, there is a high probability that harmful ghost will occur. If the value of R is 1.0f or less, no harmful ghost will occur, but the action of the concave lens will be too strong, and coma aberration, particularly chromatic coma aberration, will worsen sharply. Furthermore, the compound surface of the second-group convex lens has the action of causing light rays to diverge, and serves to favorably correct internal coma aberration that occurs in the rear group by diverging more strongly the light rays passing near the edges of the lens.

The fifteenth means used to solve the problems described above is any of the eleventh through fourteenth means, wherein the second convex lens of the rear group is a cemented lens consisting of two lenses, which are concave and convex, in that order from the object side, the concave lens is a lens made of a transmissive member with a higher refractive index and higher dispersion than the convex lens on the image side, and if we let f ou be the focal distance of the concave lens, then −1.5f<f ou<−0.8f.

The reason for this is to give the rear group the function of a concave lens having the divergence action, and to this end, the refractive index of the concave lens is set higher than that of the convex lens, thus correcting the negative spherical aberration of the rear group. When the spherical aberration of the rear group is corrected, the chief rays emitted from the center of the (aperture) diaphragm become parallel before reaching the image field, and this improves the telecentricity on the image side. Telecentricity on the image side cannot be maintained in cases where the refractive index of the concave lens is lower than that of the convex lens. Furthermore, the axial chromatic aberration and magnification chromatic aberration generated in the rear group can both be ameliorated by using a high-dispersion material for the concave lens.

In cases where f ou is −1.5f or less, the action of the concave lens is inadequate, and the spherical aberration of the entire system becomes negative, and cannot be corrected. In cases where f ou is −0.8f or greater, the divergence action becomes too strong, so that the meridional image field curvature becomes positive; furthermore, coma aberration becomes large, particularly on the upper side, and this worsens the aberration balance.

The sixteenth means used to solve the problems described above is any of the eleventh through fifteenth means, wherein the third convex lens of the rear group is a cemented lens consisting of two lenses, which are convex and concave, in that order from the object side, and the concave lens is a lens made of a transmissive member with a higher refractive index and higher dispersion than the convex lens.

This means serves to correct even more favorably the magnification chromatic aberration, the inadequately corrected axial chromatic aberration, and the negative spherical aberration that could not be completely corrected with the second convex lens of the rear group. Correction will not be sufficient in cases where the conditions of this means are not satisfied.

The seventeenth means used to solve the problems described above is an imaging device that has the fisheye lens of any of the eleventh through sixteenth means, has the function of acquiring an image with an electronic imaging device, further has at least one mechanism out of a pan mechanism, a tilt mechanism, and a rotation mechanism, and can be operated by electrical signals or by dynamic means.

With a foveal optical system, there is a distribution to the ability to observe a subject narrowly, and resolution is higher in the center of the field of view. Therefore, there are cases in which it is desirable to make use of a pan mechanism, a tilt mechanism, or a rotation mechanism, as needed, to capture a target object in the center of the field of view. This lens has an extremely wide angle, and has high resolution and is bright all the way to the periphery, so that a combination of a pan mechanism, a tilt mechanism, and a rotation mechanism is more effective than a conventional optical system. Furthermore, a combination of a pan mechanism, a tilt mechanism, and a rotation mechanism can be realized by suitable application of universally known technology.

The eighteenth means used to solve the problems described above is an imaging device that has the fisheye lens of any of the eleventh through sixteenth means, is equipped with an electronic imaging device, and further has the function of recording or storing at least one of a captured image, the time, the direction, and the device's own coordinates, the function of identifying a subject, and the function of directing a target close to the center of the field of view according to an internal or external signal.

With a foveal optical system having the extremely wide angle of this lens, there is a distribution to the ability to observe a subject narrowly, and resolution is higher in the center of the field of view. Therefore, in cases where a pan mechanism, a tilt mechanism, or a rotation mechanism is used, as needed, to capture a target object in the center of the field of view, the possibility of identifying a subject is further enhanced, from the periphery to the center. The suitability of this photographic lens can be taken advantage of to be more completely successful at directing a target close to the center of the field of view. Furthermore, the function of recording or storing at least one of a captured image, the time, the direction, and the device's own coordinates, the function of identifying a subject, and the function of directing a target close to the center of the field of view according to an internal or external signal can be realized by suitable application of universally known technology in each case.

The nineteenth means used to solve the problems described above is an imaging device that makes use of a plurality of fisheye lenses having the same specifications as the fisheye lens of any of the eleventh through sixteenth means, wherein parallax can be utilized to acquire distance information about at least a specific place.

A general tendency of wide-angle lenses is that they do not capture parallax well, but a foveal optical system is better at capturing parallax because the focal distance of the center part is relatively long. Using the lens of the present invention is particularly advantageous in that distance information for at least a specific place can be acquired by using parallax.

The twentieth means used to solve the problems described above is an imaging device that makes use of a plurality of the fisheye lenses of any of the eleventh through sixteenth means, wherein a multi-lens has a convergence mechanism.

With the present invention, it is possible to provide a fisheye lens that can realize a foveal optical system with undiminished illuminance all the way to the periphery and with high resolution over the entire field of view, and with which a wide field of view and an extremely compact size can be attained using a single wide-angle optical system, and to provide an imaging device in which this fisheye lens is used.

EXPLANATION OF SYMBOLS

1 . . . first lens, 2 . . . second lens, 3 . . . third lens, 4 . . . fourth lens, 5 . . . fifth lens, 6 . . . sixth lens, 7 . . . filter, 8 . . . image field

EMBODIMENTS

Embodiments of the fisheye lens of the present invention will be described below. In the respective tables, "men" indicates the surface number as counted from the object side, "r" indicates the radius, "d" indicates the distance between surfaces, "Abbe No" (or "vd") indicates the Abbe number, and "nd" indicates the refractive index of the wavelength of a d ray. Furthermore, "f" indicates the overall focal distance, "R1" indicates the radius of curvature of the first surface, and ω indicates the maximum incidence angle. Moreover, "K" indicates κ in Formula (1), and C4, C6, C8, and C10 respectively indicate A, B, C, and D in Formula (1). In the respective embodiments, E and F in Formula (1) are zero.

In the aberration diagrams, furthermore, H is the maximum value along the vertical axis of spherical aberration (the height of incident light rays), ω is the maximum value along the vertical axis of field curves and distortion aberration, and H is the maximum value along the horizontal axis of coma aberration (ray aberration). In field curves, the bold lines are sagittal, and the fine lines are tangential. Furthermore, the unit of size is millimeters (mm).

Embodiment 1

Figure 1:
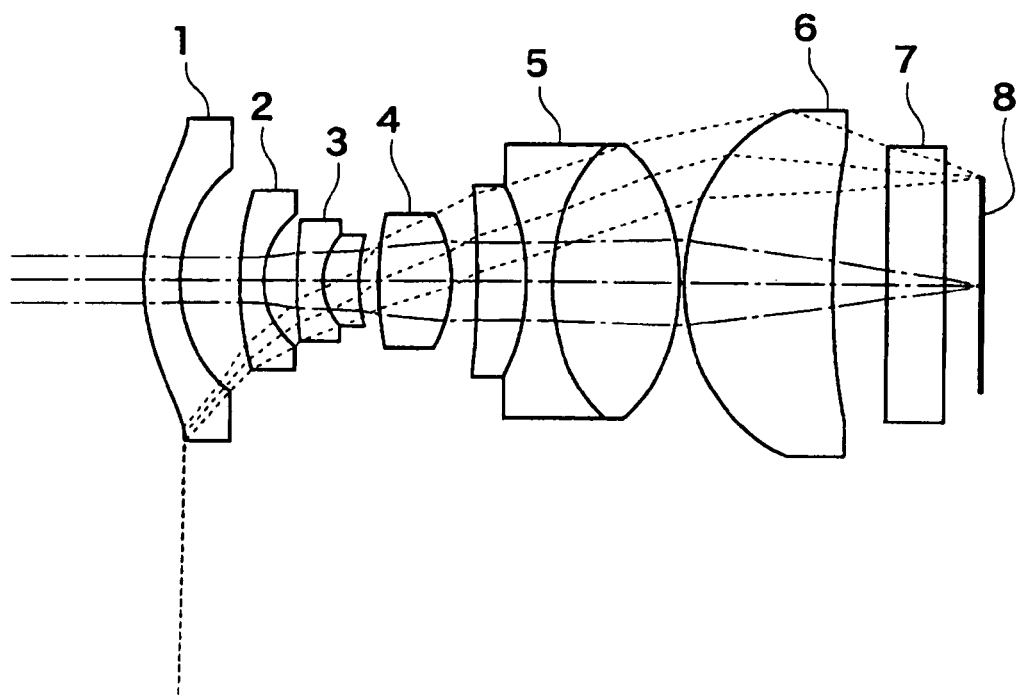
FIG. 1 is a sectional view of the lens system constituting a first embodiment of the present invention.

A fisheye lens was designed as shown in FIG. 1. In FIG. 1, 1 is a first lens, and is a concave meniscus lens with its concave surface directed toward the image side, 2 is a second lens, and is a concave meniscus lens with its concave surface directed toward the image side, and 3 is a third lens, and is a compound lens having overall convex or concave refractive power. The front group is constituted by the first lens 1, the second lens 2, and the third lens 3. 4 is a fourth lens, and is a convex lens, 5 is a fifth lens, and is a convex lens composed of a compound lens, and 6 is a sixth lens, and is a convex lens. The rear group is constituted by the fourth lens 4, the fifth lens 5, and the sixth lens 6. 7 is a filter, and 8 is the image field. The light rays depicted are those with an incidence angle of zero and the maximum incidence angle (the same applies to the following lens diagrams).

Figure 2:
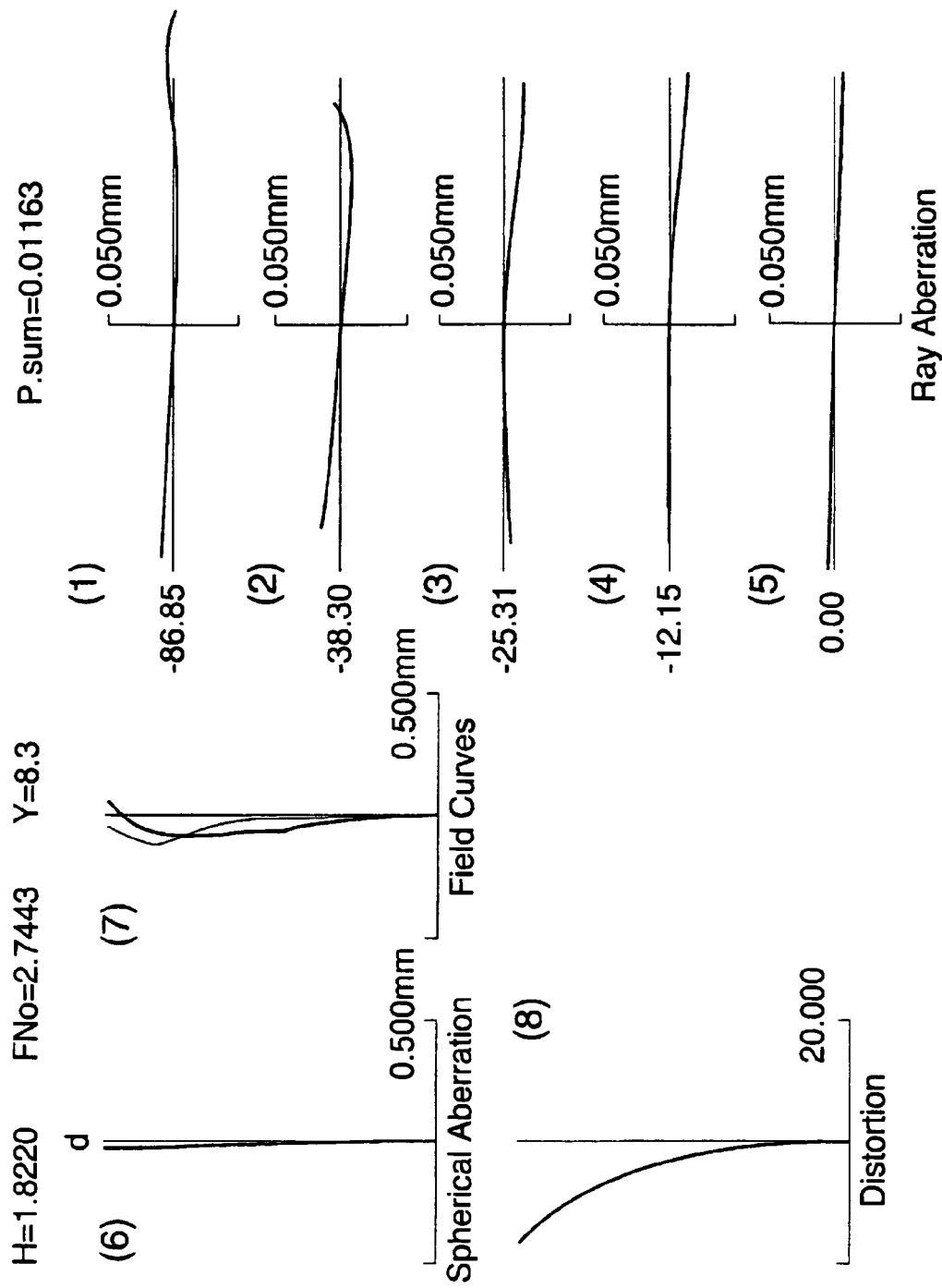
FIG. 2 is an aberration diagram of the first embodiment of the present invention.

Table 1 shows the design data for this fisheye lens, and FIG. 2 shows its aberration diagram. With this fisheye lens, furthermore, the conditions (1) through (5) described above were as follows. Moreover, in the respective tables, surface number 8 is an aperture diaphragm (not shown in the figures), and r=0 indicates a plane.

dx/dY=0.070

V=−12.388% fF=−0.974f

BFr=0.096f f ou<−1.057f

It can be seen from FIG. 2 that all of the aberrations other than distortion fit within a tiny range, while distortion increases sharply to the negative side as the incidence angle increases, and that the product has good performance as a fisheye lens.

TABLE 1 f = 10 F/2.8 2ω = 180°
Ymax: 1.26 f; Total length: 6.26 f

| men | r | d | Abbe No. | n(d) |
|---|---|---|---|---|
| 1) | 16.23704 | 2.77778 | 64.103 | 1.5168000 |
| 2) | 12.22180 | 4.27778 | | 1.0000000 |
| 3) | 25.90845 | 1.75926 | 64.103 | 1.5168000 |
| 4) | 6.49838 | 2.42593 | | 1.0000000 |
| 5) | 29.40826 | 1.85185 | 60.140 | 1.6204090 |
| 6) | 5.03538 | 2.77778 | 32.170 | 1.6727000 |
| 7) | 11.16088 | 1.29630 | | 1.0000000 |
| 8) | 0.00000 | 0.37037 | | 1.0000000 |
| 9) | 38.92748 | 5.46296 | 65.416 | 1.6030010 |
| 10) | −10.38628 | 1.85185 | | 1.0000000 |
| 11) | −66.43942 | 3.70370 | 45.001 | 1.7440000 |
| 12) | −16.66667 | 1.85185 | 27.613 | 1.7552000 |
| 13) | 16.04655 | 9.62963 | 60.645 | 1.6031100 |
| 14) | −14.98036 | 0.37037 | | 1.0000000 |
| 15) | 16.05721 | 11.11111 | 64.103 | 1.5168000 |
| 16) | 65.29879 | 4.00000 | | 1.0000000 |
| 17) | 0.00000 | 4.36940 | 64.103 | 1.5168000 |
| 18) | 0.00000 | 2.67944 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −3.78755e−05 | −4.60162e−07 | 1.48948e−10 | 0.00000e+00 |

Embodiment 2

Figure 3:
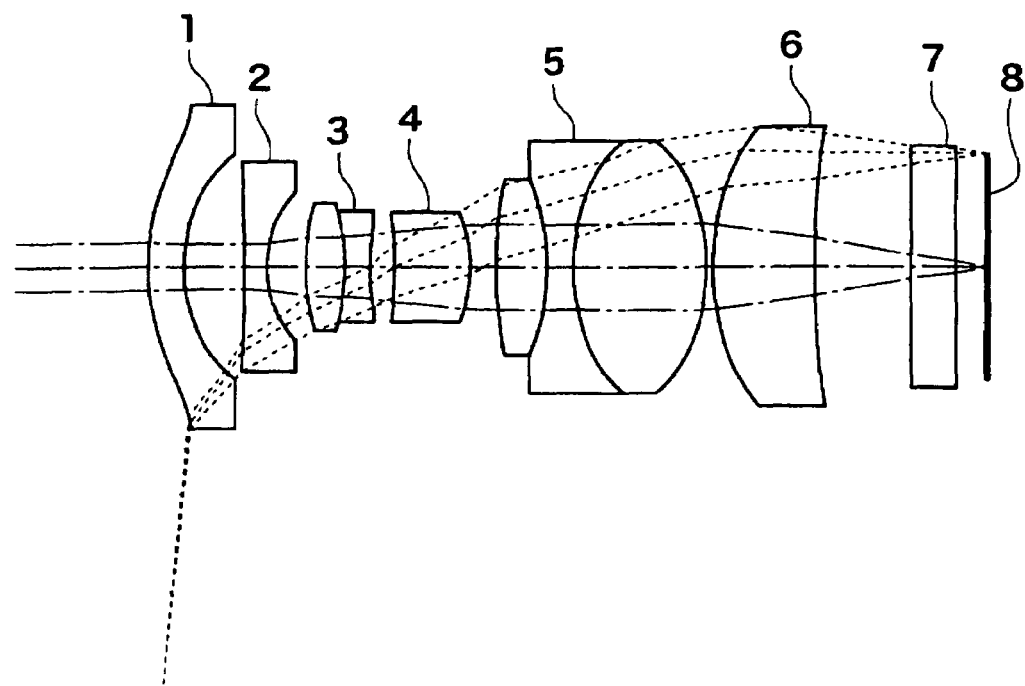
FIG. 3 is a sectional view of the lens system constituting a second embodiment of the present invention.
Figure 4:
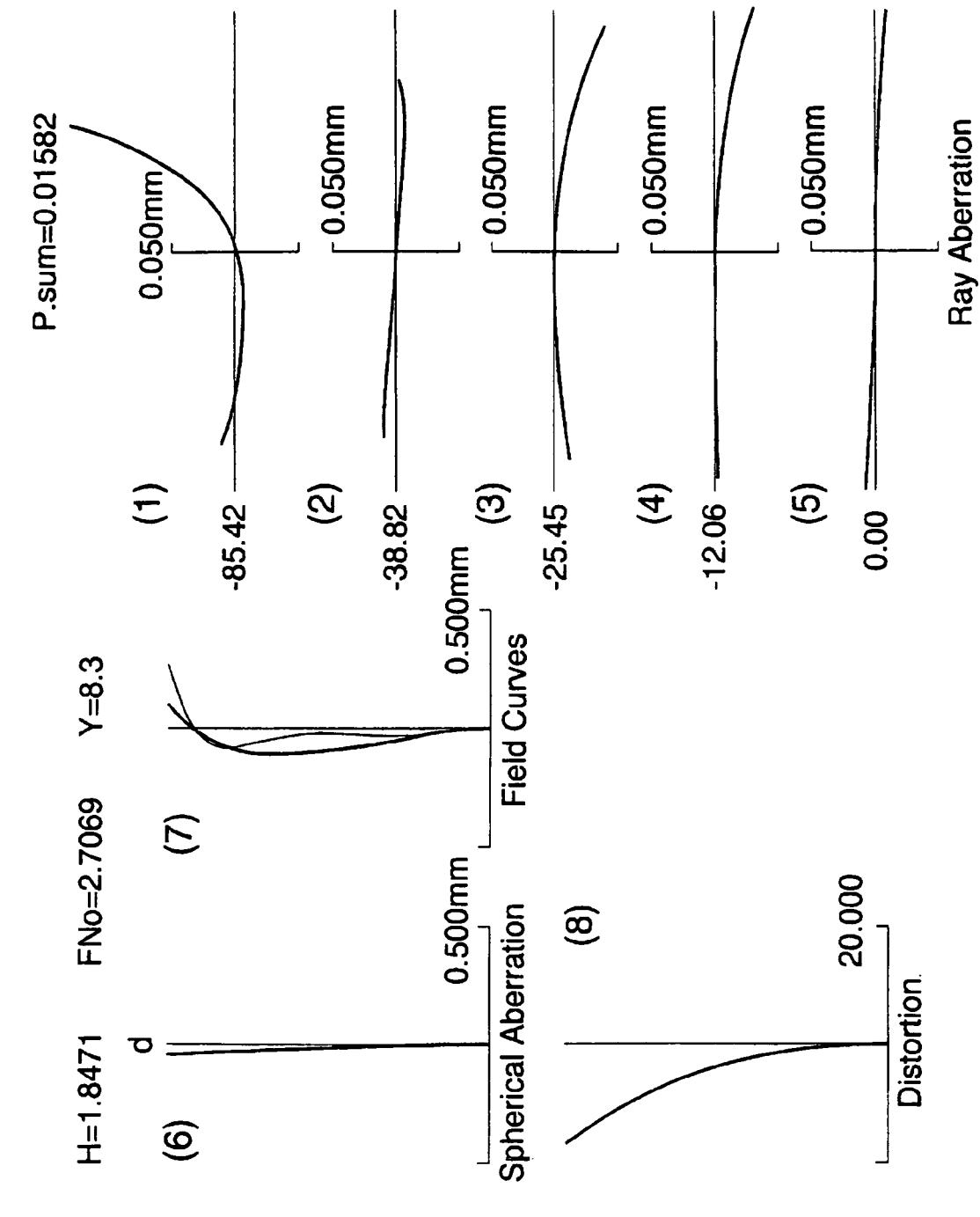
FIG. 4 is an aberration diagram of the second embodiment of the present invention.

A fisheye lens was designed as shown in FIG. 3. In the following figures illustrating the lens systems, the respective symbols indicate the same as those shown in FIG. 1, so that a description of these figures is omitted. Table 2 shows the design data for this fisheye lens, and FIG. 4 shows its aberration diagram. With this fisheye lens, furthermore, the conditions (1) through (5) described above were as follows:

dx/dY=0.190

V≧−13.195% fF=−1.313f

BFr=0.112f f ou=−0.985f

It can be seen from FIG. 4 that all of the aberrations other than distortion fit within a tiny range, while distortion increases sharply to the negative side as the incidence angle increases, and that the product has good performance as a fisheye lens.

TABLE 2 f = 10 F/2.8 2ω = 170°
Ymax: 1.20 f; Total length: 6.01 f

| men | r | d | Abbe No. | n(d) |
|---|---|---|---|---|
| 1) | 16.23704 | 2.77778 | 64.103 | 1.5168000 |
| 2) | 12.22180 | 4.27778 | | 1.0000000 |
| 3) | −144.28284 | 1.75926 | 64.103 | 1.5168000 |
| 4) | 9.01458 | 2.59259 | | 1.0000000 |
| 5) | 18.28120 | 2.77778 | 32.170 | 1.6727000 |
| 6) | −19.89364 | 1.85185 | 60.140 | 1.6204090 |
| 7) | 14.15388 | 1.29630 | | 1.0000000 |
| 8) | 0.00000 | 0.37037 | | 1.0000000 |
| 9) | −76.16106 | 5.46296 | 65.416 | 1.6030010 |
| 10) | −13.98797 | 1.85185 | | 1.0000000 |
| 11) | 40.38598 | 3.70370 | 45.001 | 1.7440000 |
| 12) | −16.66667 | 1.85185 | 27.613 | 1.7552000 |
| 13) | 14.06645 | 9.62963 | 60.645 | 1.6031100 |
| 14) | −15.34593 | 0.37037 | | 1.0000000 |
| 15) | 18.51173 | 7.40741 | 64.103 | 1.5168000 |
| 16) | 77.01412 | 6.97300 | | 1.0000000 |
| 17) | 0.00000 | 3.12100 | 64.103 | 1.5168000 |
| 18) | 0.00000 | 2.06338 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −2.98399e−05 | −4.85732e−07 | −1.40848e−11 | 0.00000e+00 |

Embodiment 3

Figure 5:
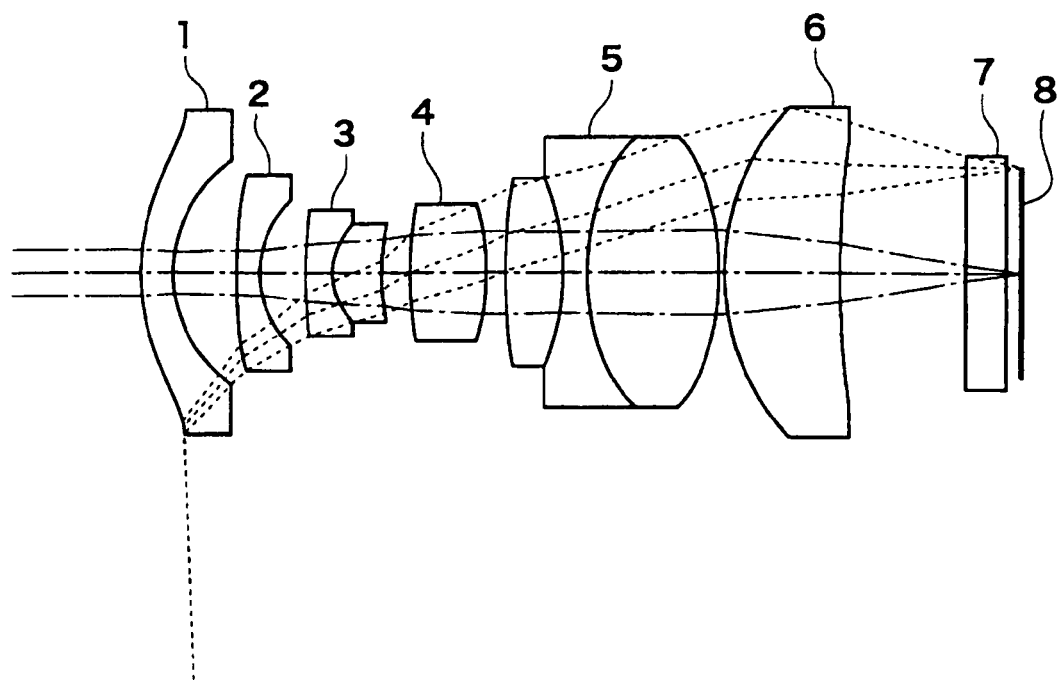
FIG. 5 is a sectional view of the lens system constituting a third embodiment of the present invention.
Figure 6:
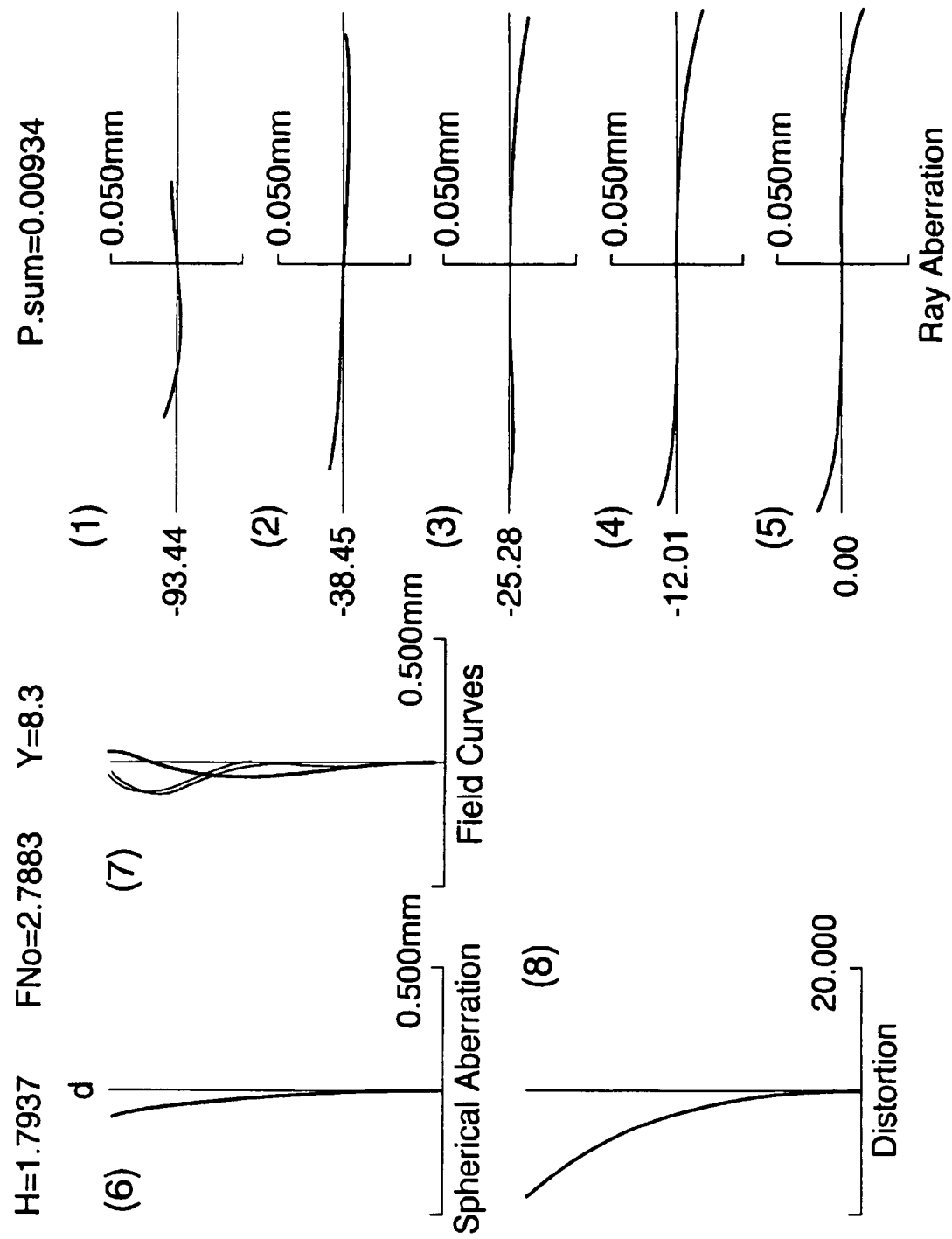
FIG. 6 is an aberration diagram of the third embodiment of the present invention.

A fisheye lens was designed as shown in FIG. 5. Table 3 shows the design data for this fisheye lens, and FIG. 6 shows its aberration diagram. With this fisheye lens, furthermore, the conditions (1) through (5) described above were as follows:

dx/dY=0.081
V=−13.301%
fF=−1.150f
BFr=0.190f
f ou=−1.085f

It can be seen from FIG. 6 that all of the aberrations other than distortion fit within a tiny range, while distortion increases sharply to the negative side as the incidence angle increases, and that the product has good performance as a fisheye lens.

Embodiment 4

Figure 7:
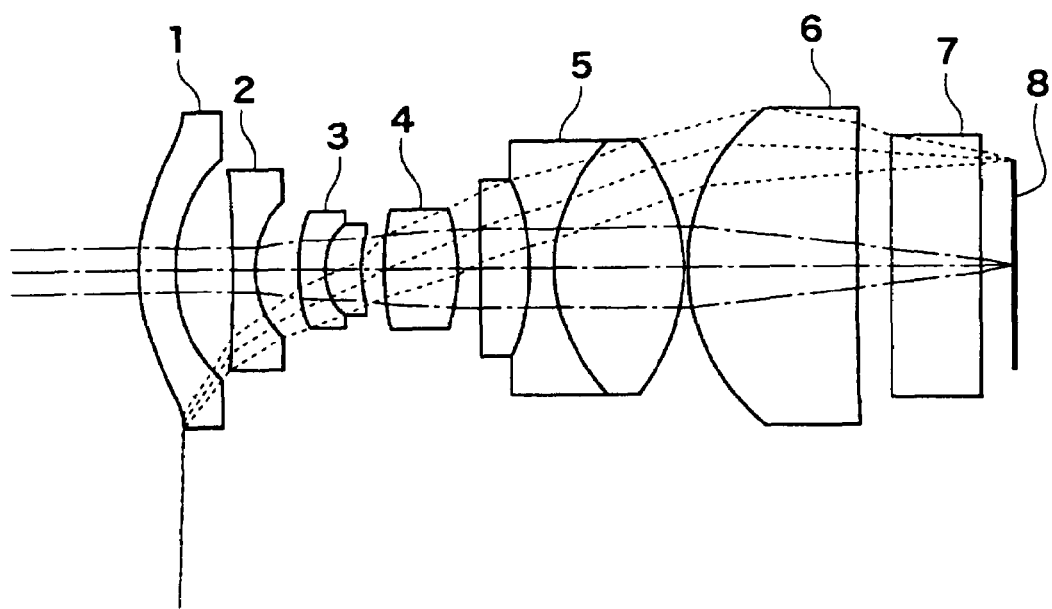
FIG. 7 is a sectional view of the lens system constituting a fourth embodiment of the present invention.
Figure 8:
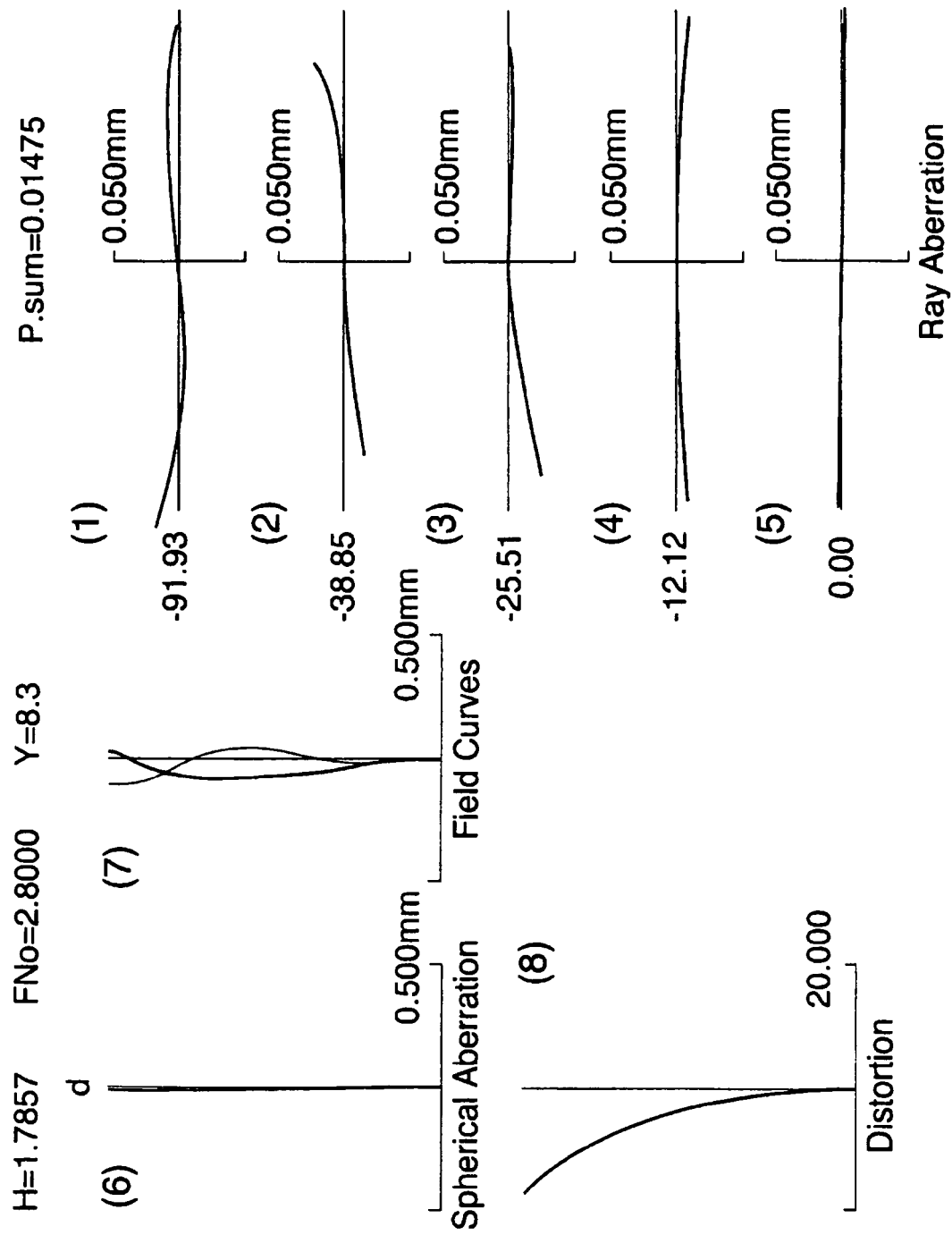
FIG. 8 is an aberration diagram of the fourth embodiment of the present invention.

A fisheye lens was designed as shown in FIG. 7. Table 4 shows the design data for this fisheye lens, and FIG. 8 shows its aberration diagram. With this fisheye lens, furthermore, the conditions (1) through (5) described above were as follows:

dx/dY=0.192
V=−13.053%
fF=−0.997f
BFr=0.086f
f ou=−0.984f

It can be seen from FIG. 8 that all of the aberrations other than distortion fit within a tiny range, while distortion increases sharply to the negative side as the incidence angle increases, and that the product has good performance as a fisheye lens.

TABLE 3 f = 10 F/2.8 2ω = 186°
Ymax: 1.28 f; Total length: 6.71 f

| men | r | d | Abbe No. | n(d) |
|---|---|---|---|---|
| 1) | 15.83644 | 2.67516 | 64.119 | 1.5168000 |
| 2) | 10.96800 | 4.81530 | | 1.0000000 |
| 3) | 50.83969 | 1.78344 | 64.119 | 1.5168000 |
| 4) | 7.94024 | 3.56689 | | 1.0000000 |
| 5) | 89.11232 | 1.78344 | 57.033 | 1.6228000 |
| 6) | 5.35122 | 3.92357 | 31.075 | 1.6889300 |
| 7) | 21.45605 | 1.78344 | | 1.0000000 |
| 8) | 0.00000 | 0.35669 | | 1.0000000 |
| 9) | 39.25144 | 5.70702 | 60.675 | 1.6031100 |
| 10) | −18.71996 | 1.42675 | | 1.0000000 |
| 11) | 60.99400 | 4.63695 | 53.852 | 1.7130000 |
| 12) | −18.73346 | 1.78344 | 25.432 | 1.8051800 |
| 13) | 17.05435 | 9.98728 | 60.675 | 1.6031100 |
| 14) | −21.33471 | 0.35669 | | 1.0000000 |
| 15) | 19.58528 | 8.73887 | 47.384 | 1.7880000 |
| 16) | 77.86359 | 9.69590 | | 1.0000000 |
| 17) | 0.00000 | 3.12100 | 64.103 | 1.5168000 |
| 18) | 0.00000 | 1.00003 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −3.26000e−05 | −3.94246e−07 | −7.92959e−10 | 2.16819e−12 |

TABLE 4 f = 10 F/2.8 2ω = 180°
Ymax: 1.21 f; Total length: 6.52 f

| men | r | d | Abbe No. | n(d) |
|---|---|---|---|---|
| 1) | 16.14826 | 2.77778 | 64.103 | 1.5168000 |
| 2) | 12.15498 | 4.27778 | | 1.0000000 |
| 3) | −158.08813 | 1.85185 | 64.103 | 1.5168000 |
| 4) | 8.11306 | 3.14815 | | 1.0000000 |
| 5) | 18.47707 | 1.85185 | 60.140 | 1.6204090 |
| 6) | 4.73096 | 2.77778 | 32.170 | 1.6727000 |
| 7) | 10.72441 | 1.29630 | | 1.0000000 |
| 8) | 0.00000 | 0.37037 | | 1.0000000 |
| 9) | 23.26917 | 5.46296 | 65.416 | 1.6030010 |
| 10) | −14.81596 | 1.85185 | | 1.0000000 |
| 11) | −374.53501 | 3.70370 | 45.001 | 1.7440000 |

TABLE 4-continued f = 10 F/2.8 2ω = 180°
Ymax: 1.21 f; Total length: 6.52 f

| | | | |
|---|---|---|---|
| 12) | −16.57556 | 1.85185 | 27.613 | 1.7552000 |
| 13) | 14.12239 | 9.62963 | 60.645 | 1.6031100 |
| 14) | −16.34544 | 0.37037 | | 1.0000000 |
| 15) | 16.87057 | 12.59259 | 64.103 | 1.5168000 |
| 16) | 325.30273 | 2.50000 | | 1.0000000 |
| 17) | 0.00000 | 6.70000 | 69.757 | 1.5489210 |
| 18) | 0.00000 | 2.14275 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −2.78593e−05 | −4.53574e−07 | 9.20207e−11 | −1.75582e−12 |

Embodiment 5

Figure 9:
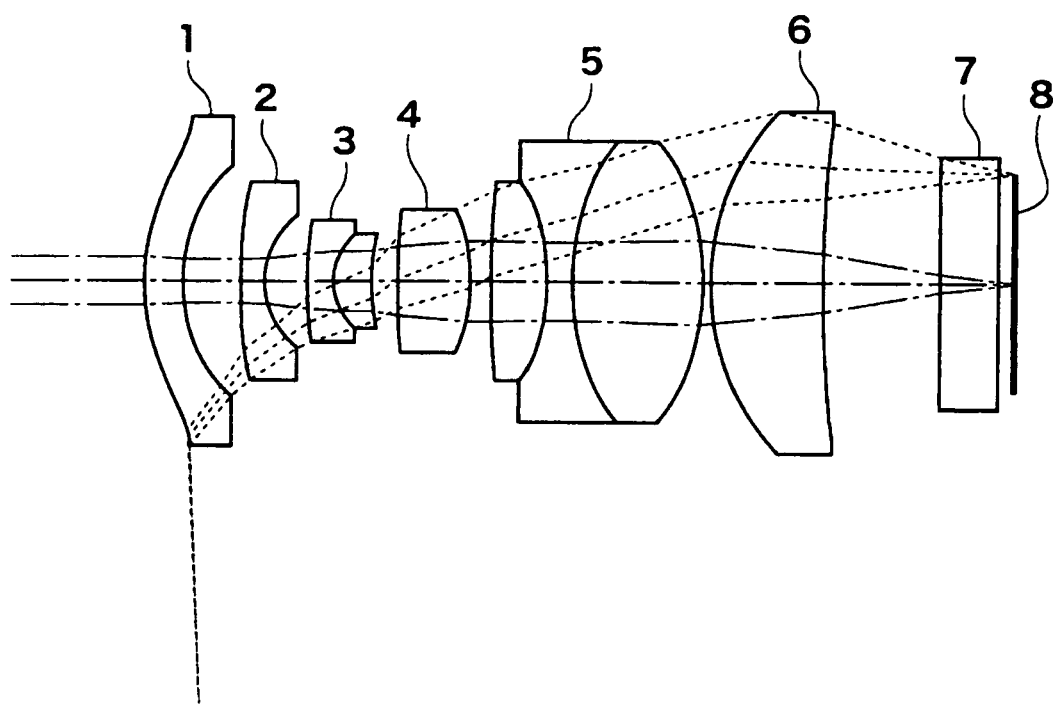
FIG. 9 is a sectional view of the lens system constituting a fifth embodiment of the present invention.
Figure 10:
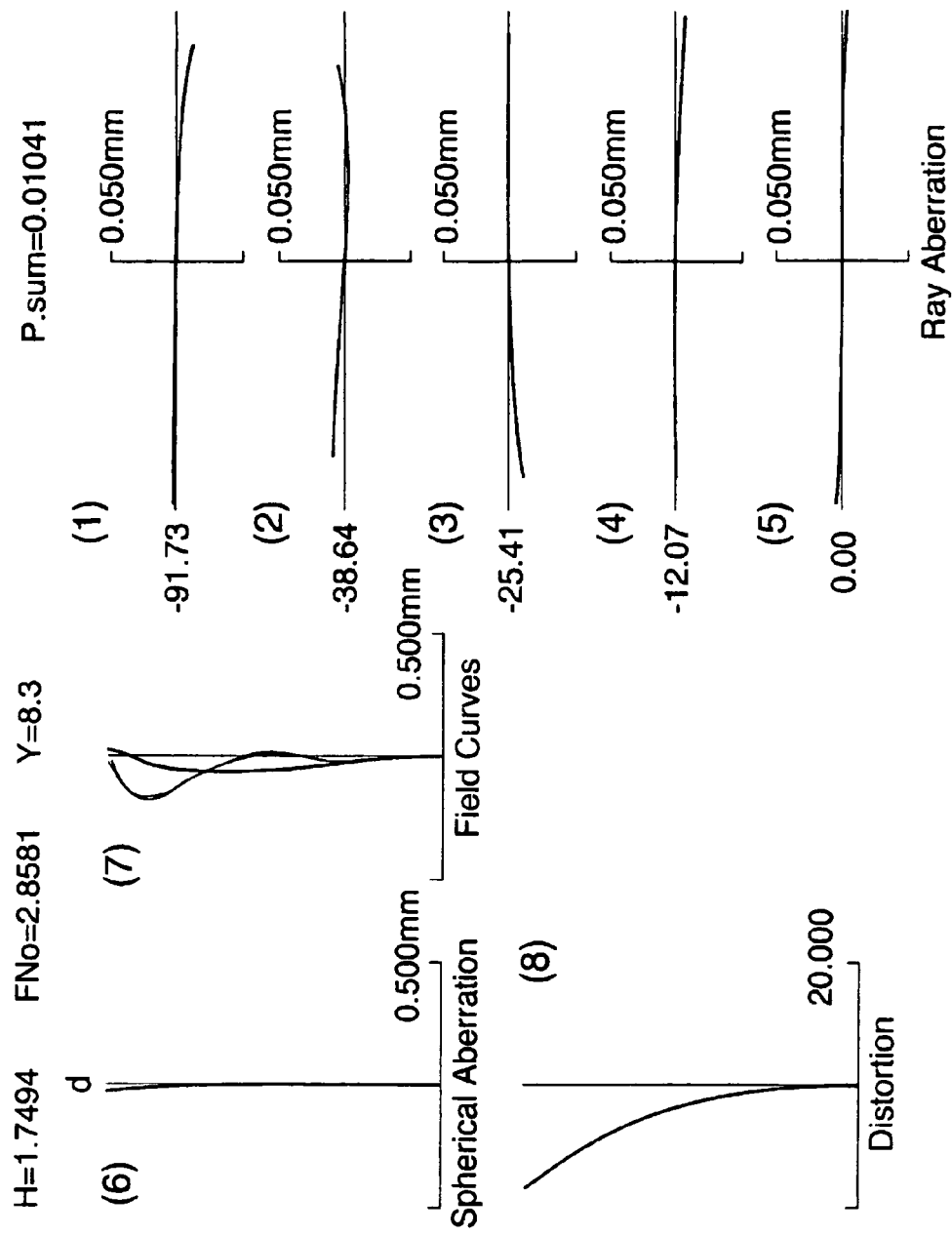
FIG. 10 is an aberration diagram of the fifth embodiment of the present invention.

A fisheye lens was designed as shown in FIG. 9. Table 5 shows the design data for this fisheye lens, and FIG. 10 shows its aberration diagram. With this fisheye lens, furthermore, the conditions (1) through (5) described above were as follows:

dx/dY=0.150
V=−12.898%
fF=−1.117f
BFr=0.146f
f ou<−1.078f

It can be seen from FIG. 10 that all of the aberrations other than distortion fit within a tiny range, while distortion increases sharply to the negative side as the incidence angle increases, and that the product has good performance as a fisheye lens.

Embodiment 6

Figure 11:
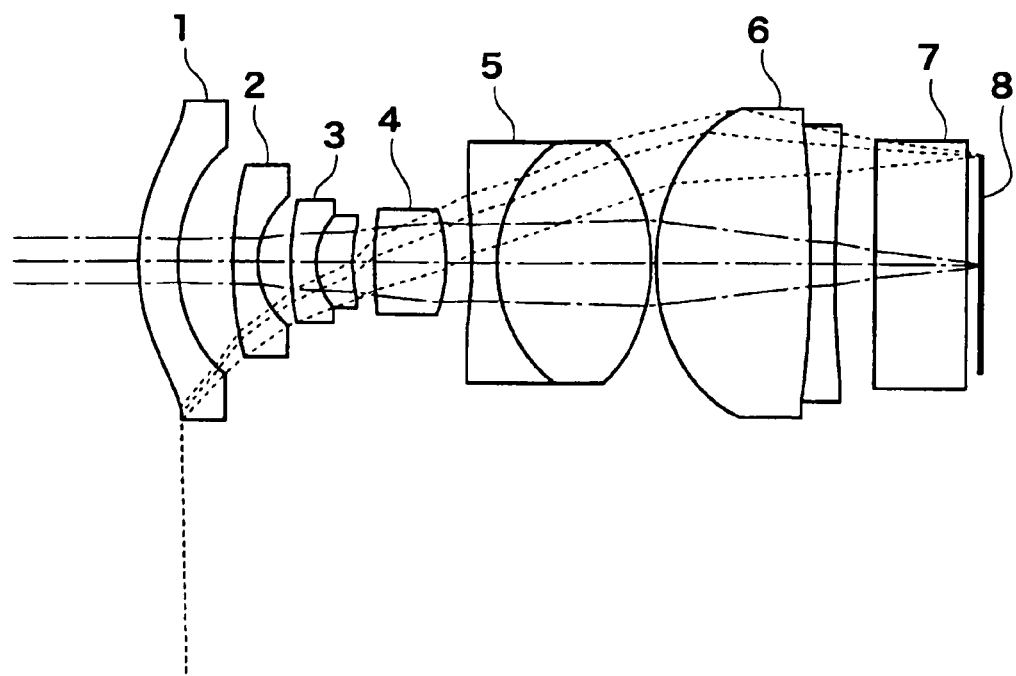
FIG. 11 is a sectional view of the lens system constituting a sixth embodiment of the present invention.

A fisheye lens was designed as shown in FIG. 11. In FIG. 11, 1 is a first lens, and is a concave meniscus lens with its concave surface directed toward the image side, 2 is a second lens, and is a concave lens with its concave surface directed toward the image side, and 3 is a third lens, and is a compound lens having overall convex or concave refractive power. The front group is constituted by the first lens 1, the second lens 2, and the third lens 3. 4 is a fourth lens, 5 is a fifth lens, and is a compound lens, and 6 is a sixth lens, and is a compound lens. The rear group is constituted by the fourth lens 4, the fifth lens 5, and the sixth lens 6. 7 is a filter, and 8 is the image field. The light rays depicted are those with an incidence angle of zero and the maximum incidence angle (the same applies to the following lens diagrams).

TABLE 5 f = 10 F/2.8 2ω = 187°
Ymax: 1.25 f; Total length: 6.37 f

| men | r | d | Abbe No. | n(d) |
|---|---|---|---|---|
| 1) | 15.94486 | 2.77778 | 64.103 | 1.5168000 |
| 2) | 11.95320 | 4.25926 | | 1.0000000 |
| 3) | 41.42787 | 1.85185 | 64.103 | 1.5168000 |
| 4) | 6.98066 | 3.14815 | | 1.0000000 |
| 5) | 52.68603 | 1.85185 | 60.140 | 1.6204090 |
| 6) | 5.20023 | 2.77778 | 31.079 | 1.6889300 |
| 7) | 17.35400 | 1.29630 | | 1.0000000 |
| 8) | 0.00000 | 0.55556 | | 1.0000000 |
| 9) | 51.17829 | 5.46296 | 60.645 | 1.6031100 |
| 10) | −14.66156 | 1.48148 | | 1.0000000 |
| 11) | 102.47912 | 4.07407 | 53.925 | 1.7130000 |
| 12) | −16.57555 | 1.85185 | 25.346 | 1.8051820 |
| 13) | 19.14273 | 9.62963 | 60.645 | 1.6031100 |
| 14) | −18.18563 | 0.37037 | | 1.0000000 |
| 15) | 19.03236 | 8.33246 | 50.188 | 1.7199990 |
| 16) | 88.04339 | 8.58917 | | 1.0000000 |
| 17) | 0.00000 | 4.36940 | 64.103 | 1.5168000 |
| 18) | 0.00000 | 1.00000 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −3.24913e−05 | −5.17497e−07 | 4.53103e−10 | −1.51058e−12 |

Figure 12:
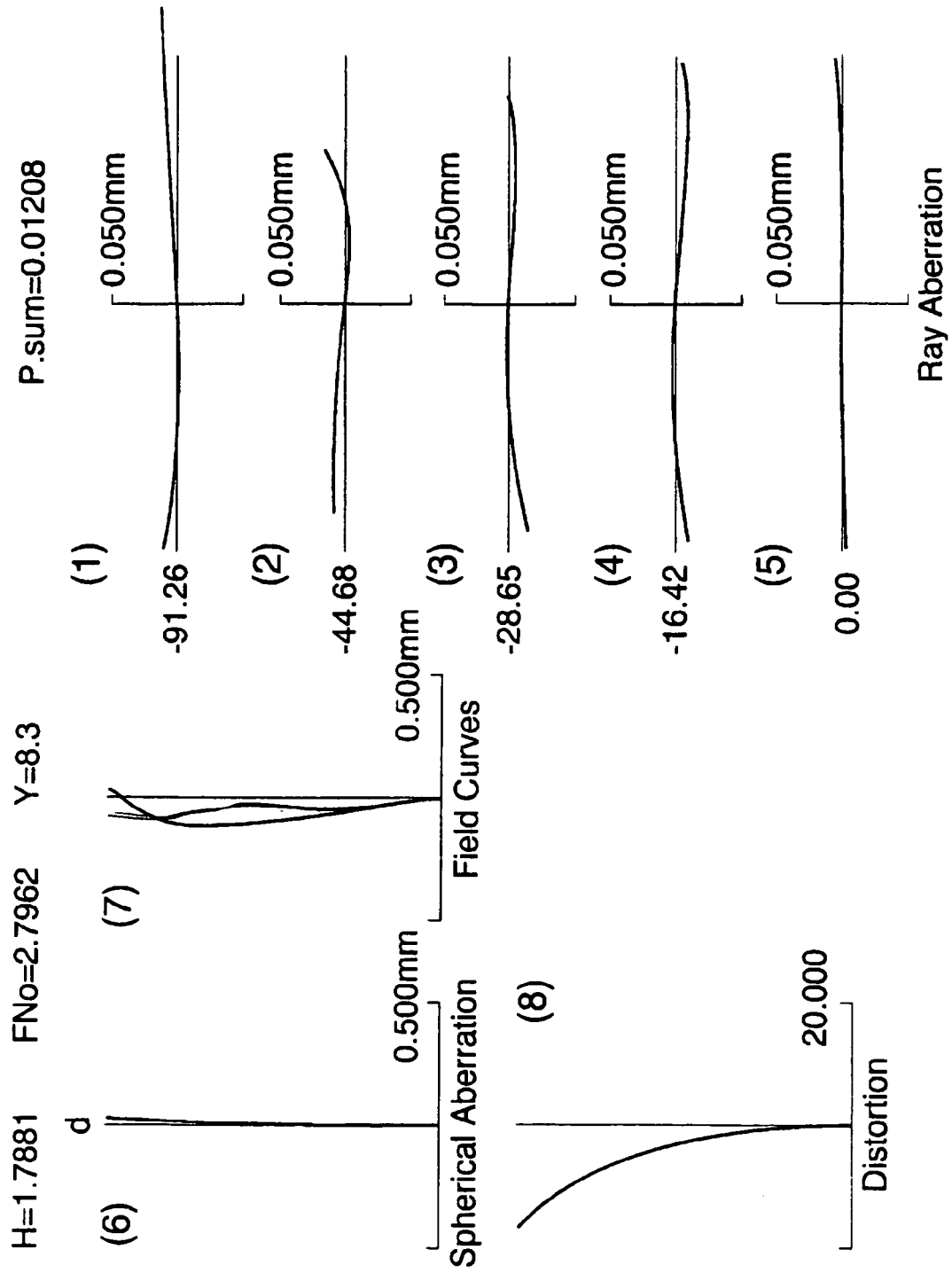
FIG. 12 is an aberration diagram of the sixth embodiment of the present invention.

Table 6 shows the design data for this fisheye lens, and FIG. 12 shows its aberration diagram. A parallel plane member having integrated functions such as a color filter, CCD cover glass, and low-pass filter is included in the vicinity of the focal point (surfaces 17 and 18). There are no restrictions on the positions of the 16th and subsequent surfaces. When focusing is needed, either the entire lens system may be deployed, or surfaces 1 through 16 may be deployed. Furthermore, in the respective tables, surface number 8 is an aperture diaphragm (not shown in the figures), and r=0 indicates a plane.

With this fisheye lens, the conditions (6) through (9) described above and f ou were as follows:

dx/dY=0.135
V=−12.168%
fF=−0.912f
R=1.198f
f ou=−1.298f

Figure 13:
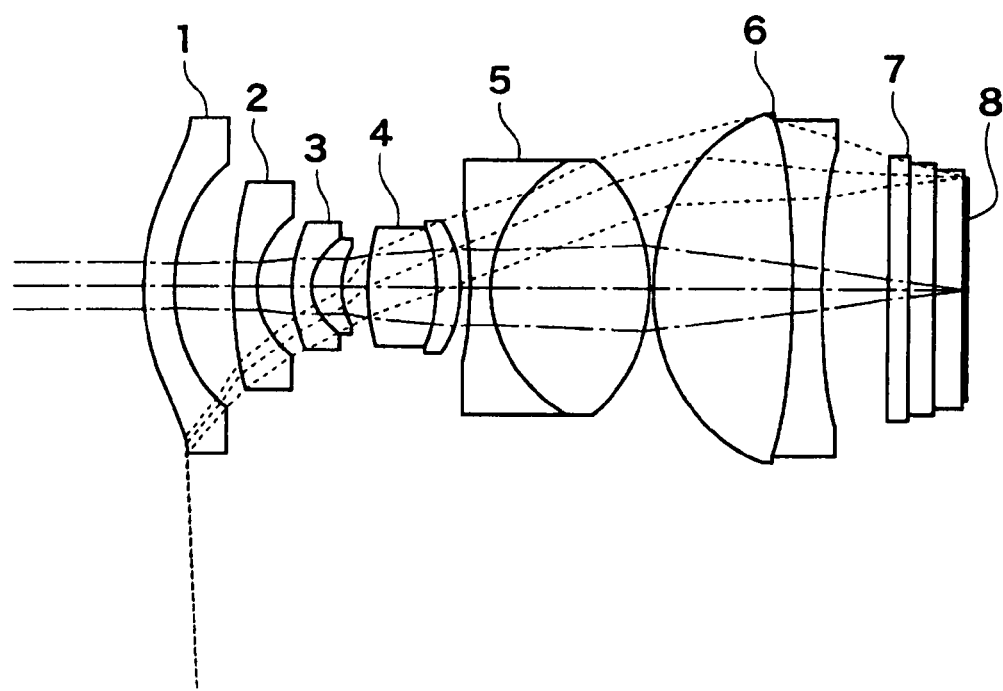
FIG. 13 is a sectional view of the lens system constituting a seventh embodiment of the present invention.
Figure 14:
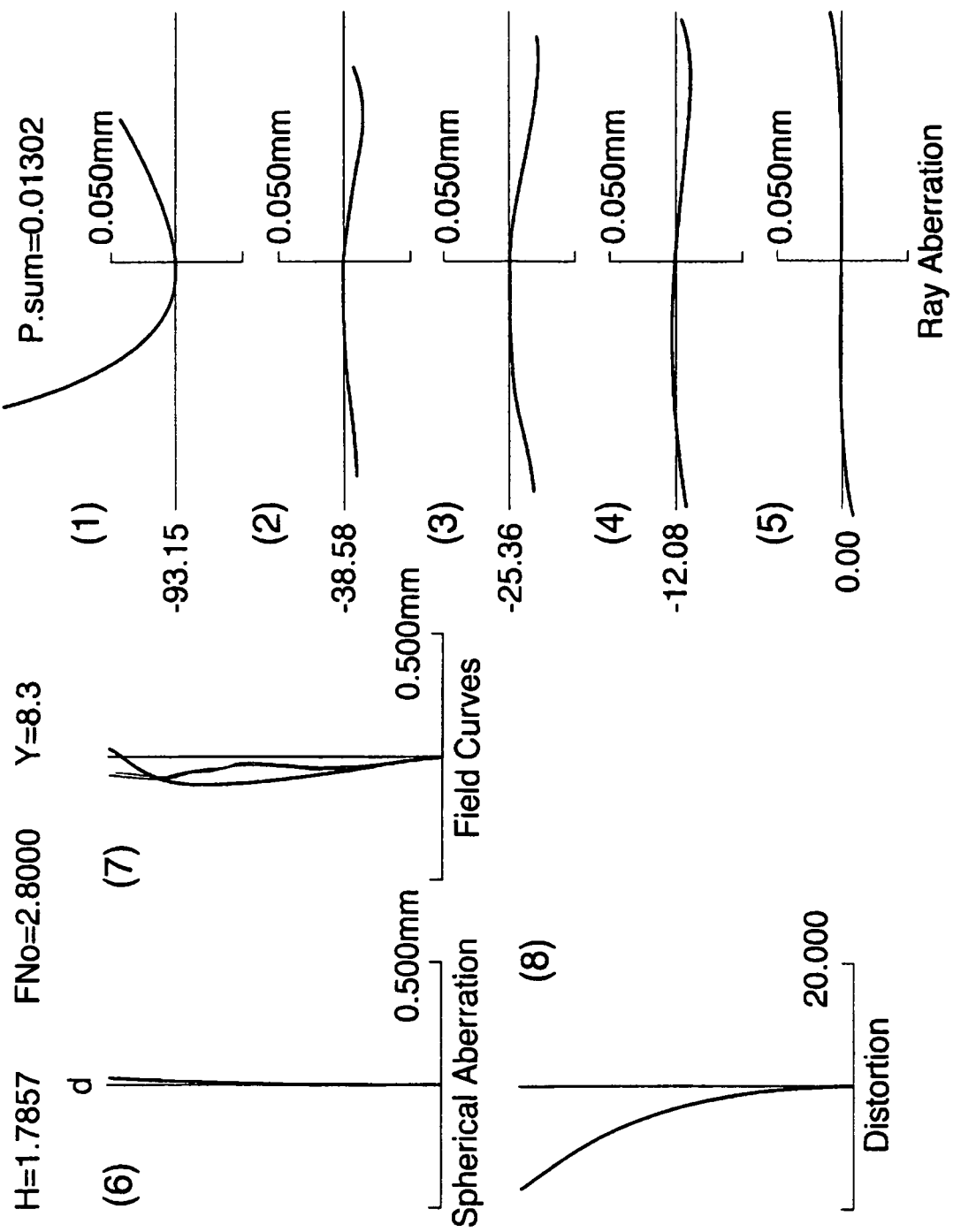
FIG. 14 is an aberration diagram of the seventh embodiment of the present invention.

It can be seen from FIG. 12 that all of the aberrations other than distortion fit within a tiny range, while distortion increases sharply to the negative side as the incidence angle increases, and that the product has good performance as a fisheye lens.

a description of these figures is omitted. In FIG. 13, furthermore, the fourth lens is also composed of a compound lens. Moreover, the shape of the filter 7 is different in each figure. Table 7 shows the design data for this fisheye lens, and FIG. 14 shows its aberration diagram. Near the focal point (surfaces 18 through 20) are a color filter, CCD cover glass, and low-pass filter. There is no great difference, in terms of aberration performance, in the position in the optical axis direction and in the thickness, refractive index, dispersion, and so forth between these parallel plane members. There will be no major difference if some or all of these are eliminated. There are no restrictions on the positions of the parallel plane members at the 17th and subsequent surfaces. When focusing is needed, either the entire lens system may be deployed, or surfaces 1 through 17 may be deployed.

With this fisheye lens, furthermore, the conditions (6) through (9) described above and f ou were as follows:

dx/dY=0.144
V=−12.877%
F=−0.986f
R=1.082f
f ou=−1.019f

TABLE 6 f = 10 F/2.8 2ω = 184°
Ymax: 1.26 f; Total length: 6.26 f

| men | r | d | vd | n(d) |
|---|---|---|---|---|
| 1) | 16.24754 | 2.77957 | 64.103 | 1.5168000 |
| 2) | 12.22968 | 4.28054 | | 1.0000000 |
| 3) | 39.33372 | 1.76040 | 64.103 | 1.5168000 |
| 4) | 6.57959 | 2.42749 | | 1.0000000 |
| 5) | 23.07367 | 1.85305 | 60.140 | 1.6204090 |
| 6) | 4.82264 | 2.77957 | 32.170 | 1.6727000 |
| 7) | 10.14585 | 1.29713 | | 1.0000000 |
| 8) | 0.00000 | 0.37061 | | 1.0000000 |
| 9) | 22.73193 | 5.46650 | 65.416 | 1.6030010 |
| 10) | −10.94696 | 1.85305 | | 1.0000000 |
| 11) | −57.55036 | 1.85305 | 27.613 | 1.7552000 |
| 12) | 11.98382 | 11.48891 | 60.645 | 1.6031100 |
| 13) | −14.80234 | 0.37061 | | 1.0000000 |
| 14) | 15.62816 | 11.48891 | 64.103 | 1.5168000 |
| 15) | −71.23000 | 1.85305 | 25.346 | 1.8051820 |
| 16) | 126.58685 | 3.06517 | | 1.0000000 |
| 17) | 0.00000 | 6.75908 | 69.758 | 1.5489210 |
| 18) | 0.00000 | 0.94080 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −2.99638e−05 | −5.18207e−07 | 2.15051e−10 | 5.96301e−15 |

Embodiment 7

A fisheye lens was designed as shown in FIG. 13. In the following figures illustrating lens systems, the respective symbols indicate the same as those shown in FIG. 11, so that It can be seen from FIG. 14 that all of the aberrations other than distortion fit within a tiny range, while distortion increases sharply to the negative side as the incidence angle increases, and that the product has good performance as a fisheye lens.

TABLE 7 f = 10 F/2.8 2ω = 185°
Ymax: 1.20 f; Total length: 6.01 f

| men | r | d | vd | n(d) |
|---|---|---|---|---|
| 1) | 16.21656 | 2.28117 | 64.103 | 1.5168000 |
| 2) | 12.89339 | 4.27719 | | 1.0000000 |
| 3) | 36.06375 | 1.71088 | 64.103 | 1.5168000 |

TABLE 7-continued f = 10 F/2.8 2ω = 185°
Ymax: 1.20 f; Total length: 6.01 f

| men | r | d | vd | n(d) |
|---|---|---|---|---|
| 4) | 6.94889 | 2.42374 | | 1.0000000 |
| 5) | 10.87319 | 1.42573 | 60.140 | 1.6204090 |
| 6) | 3.97043 | 2.13859 | 32.170 | 1.6727000 |
| 7) | 6.41873 | 1.84919 | | 1.0000000 |
| 8) | 0.00000 | 0.00000 | | 1.0000000 |
| 9) | 20.19943 | 4.99005 | 60.140 | 1.6204090 |
| 10) | −11.61923 | 1.59476 | 27.613 | 1.7552000 |
| 11) | −10.13753 | 0.71286 | | 1.0000000 |
| 12) | −28.12208 | 1.42573 | 27.613 | 1.7552000 |
| 13) | 10.82348 | 11.40584 | 60.645 | 1.6031100 |
| 14) | −13.03481 | 0.14257 | | 1.0000000 |
| 15) | 14.68300 | 9.98472 | 64.103 | 1.5168000 |
| 16) | −59.41513 | 2.13859 | 27.613 | 1.7552000 |
| 17) | 61.65984 | 4.77869 | | 1.0000000 |
| 18) | 0.00000 | 1.44262 | 69.757 | 1.5489210 |
| 19) | 0.00000 | 1.84951 | 58.667 | 1.5280000 |
| 20) | 0.00000 | 2.03446 | 69.757 | 1.5489210 |
| 21) | 0.00000 | 0.00002 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −2.85889e−05 | −6.51372e−07 | 9.05451e−10 | 0.00000e+00 |

Embodiment 8

Figure 15:
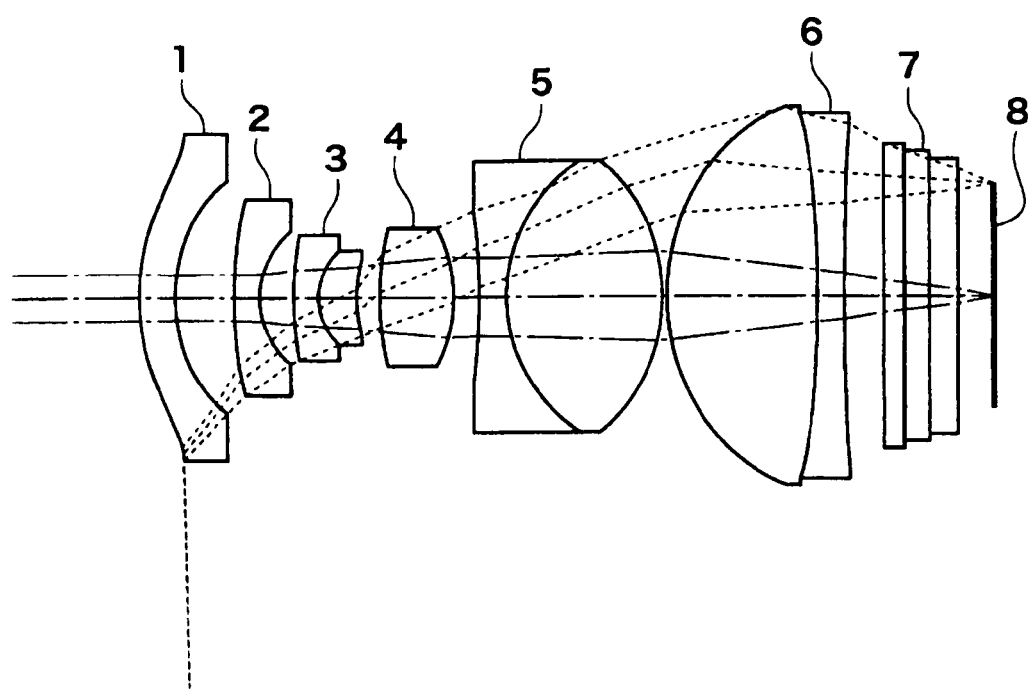
FIG. 15 is a sectional view of the lens system constituting an eighth embodiment of the present invention.

A fisheye lens was designed as shown in FIG. 15. Table 8 shows the design data for this fisheye lens, and FIG. 16 shows its aberration diagram.

With this fisheye lens, furthermore, the conditions (6) through (9) described above and f ou were as follows:

dx/dY=0.143
V=−12.200%
fF=−0.930f
R=1.215f
f ou=−1.239f

Figure 16:
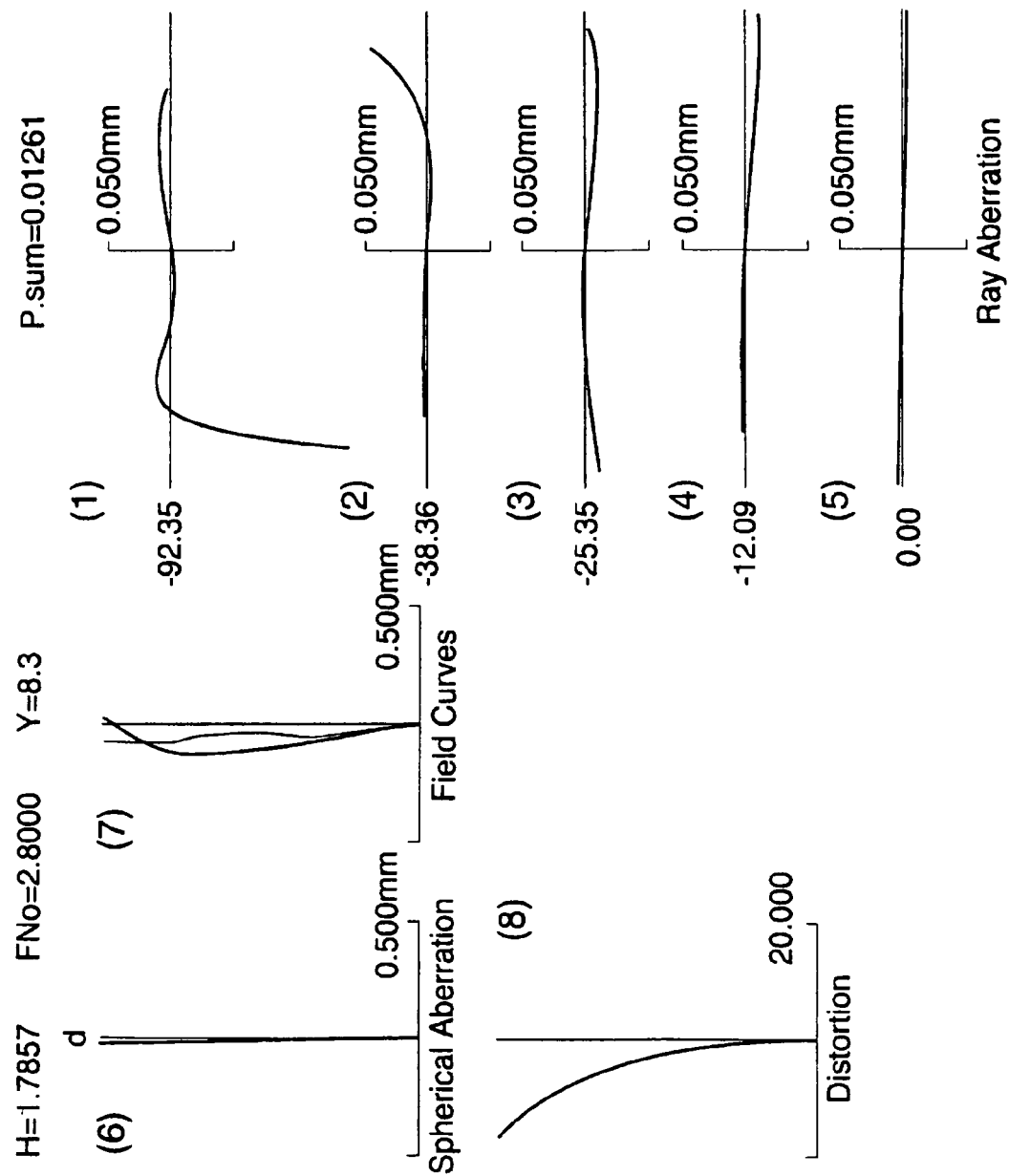
FIG. 16 is an aberration diagram of the eighth embodiment of the present invention.

It can be seen from FIG. 16 that all of the aberrations other than distortion fit within a tiny range, while distortion increases sharply to the negative side as the incidence angle increases, and that the product has good performance as a fisheye lens.

TABLE 8 f = 10 F/2.8 2ω = 186°
Ymax: 1.23 f; Total length: 6.25 f

| men | r | d | vd | n(d) |
|---|---|---|---|---|
| 1) | 16.23704 | 2.77778 | 64.103 | 1.5168000 |
| 2) | 12.22178 | 4.27778 | | 1.0000000 |
| 3) | 41.53187 | 1.75926 | 64.103 | 1.5168000 |
| 4) | 6.72587 | 2.42593 | | 1.0000000 |
| 5) | 20.59815 | 1.85185 | 60.140 | 1.6204090 |
| 6) | 4.73891 | 2.77778 | 32.170 | 1.6727000 |
| 7) | 9.72522 | 1.29630 | | 1.0000000 |
| 8) | 0.00000 | 0.37037 | | 1.0000000 |
| 9) | 24.16643 | 5.46296 | 65.416 | 1.6030010 |
| 10) | −10.74165 | 1.85185 | | 1.0000000 |
| 11) | −43.44058 | 1.85185 | 27.613 | 1.7552000 |
| 12) | 12.15009 | 11.48148 | 60.645 | 1.6031100 |
| 13) | −14.23054 | 0.37037 | | 1.0000000 |
| 14) | 15.99928 | 10.92593 | 64.103 | 1.5168000 |
| 15) | −73.59880 | 1.85185 | 25.346 | 1.8051820 |
| 16) | 237.48141 | 3.04359 | | 1.0000000 |
| 17) | 0.00000 | 1.44444 | 69.757 | 1.5489210 |
| 18) | 0.00000 | 1.85185 | 58.667 | 1.5280000 |
| 19) | 0.00000 | 2.03704 | 69.757 | 1.5489210 |
| 20) | 0.00000 | 2.75928 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −3.12626e−05 | −4.98442e−07 | 1.34237e−10 | 0.00000e+00 |

Embodiment 9

Figure 17:
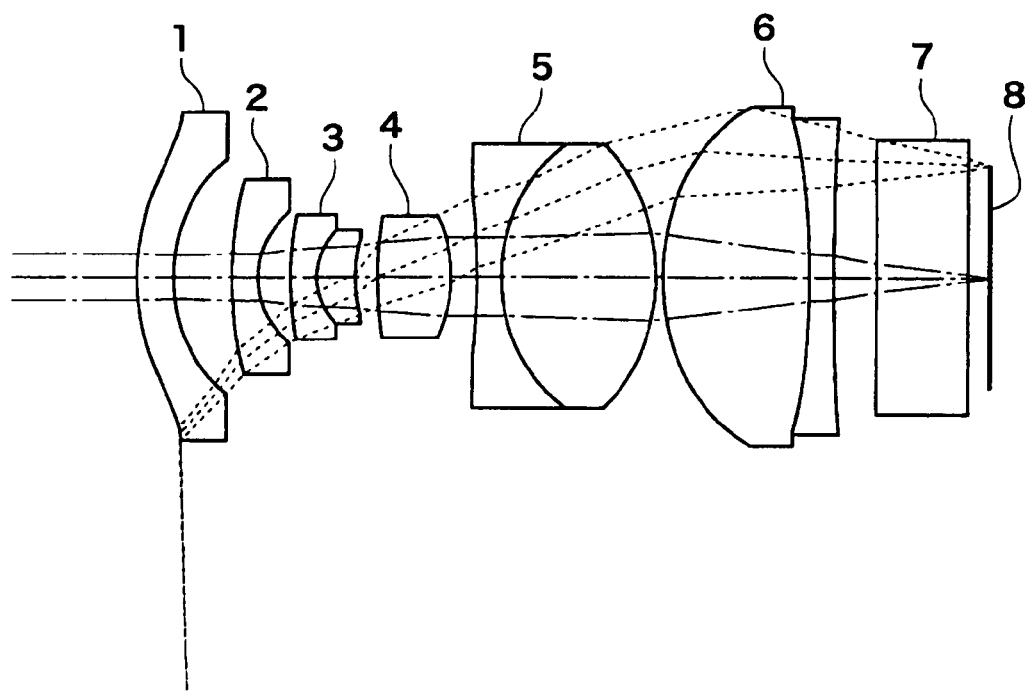
FIG. 17 is a sectional view of the lens system constituting a ninth embodiment of the present invention.
Figure 18:
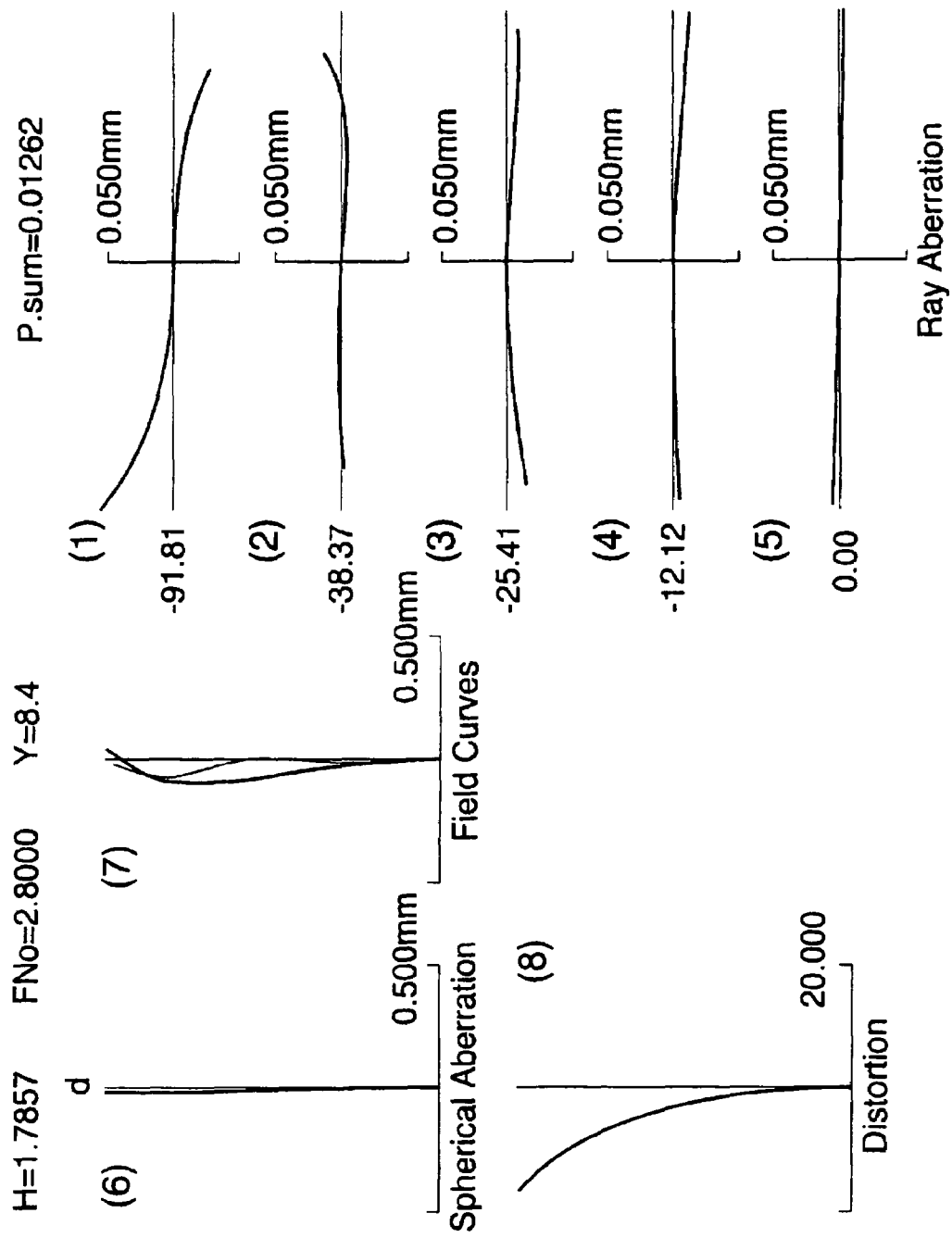
FIG. 18 is an aberration diagram of the ninth embodiment of the present invention.

A fisheye lens was designed as shown in FIG. 17. Table 9 shows the design data for this fisheye lens, and FIG. 18 shows its aberration diagram. With this fisheye lens, furthermore, the conditions (6) through (9) described above and f ou were as follows:

dx/dY=0.071
V=−11.832%
F=−0.940f
R=1.270f
f ou=−1.317f

It can be seen from FIG. 18 that all of the aberrations other than distortion fit within a tiny range, while distortion increases sharply to the negative side as the incidence angle increases, and that the product has good performance as a fisheye lens.

Embodiment 10

Figure 19:
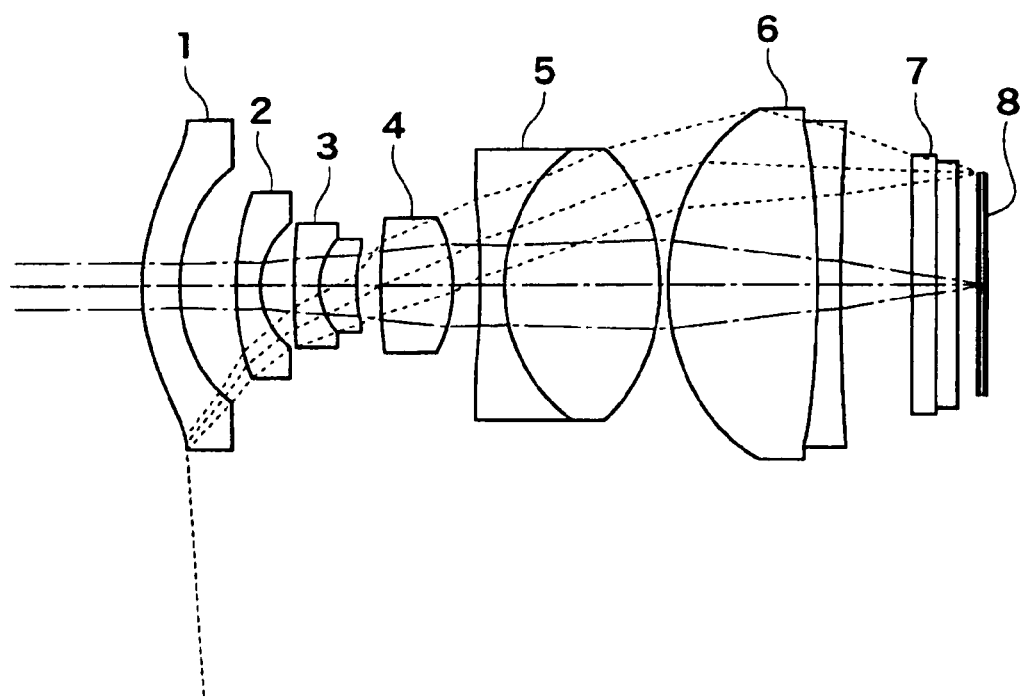
FIG. 19 is a sectional view of the lens system constituting a tenth embodiment of the present invention.
Figure 20:
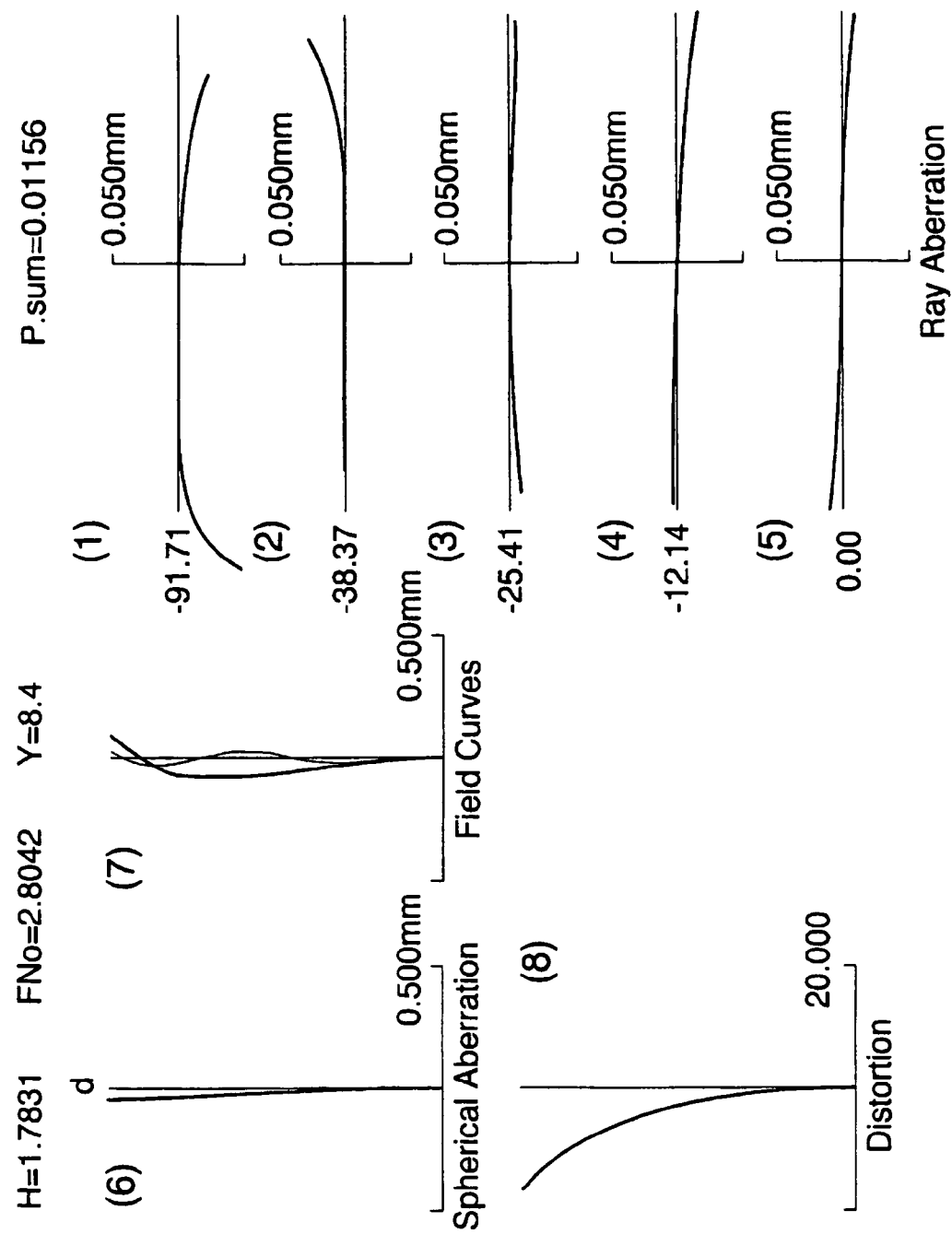
FIG. 20 is an aberration diagram of the tenth embodiment of the present invention.

A fisheye lens was designed as shown in FIG. 19. Table 10 shows the design data for this fisheye lens, and FIG. 20 shows its aberration diagram. With this fisheye lens, furthermore, the conditions (6) through (9) described above and f ou were as follows:

dx/dY=0.060
V=−11.718%
fF=−0.908f
R=1.309f
f ou=−1.363f

It can be seen from FIG. 20 that all of the aberrations other than distortion fit within a tiny range, while distortion increases sharply to the negative side as the incidence angle increases, and that the product has good performance as a fisheye lens.

TABLE 9 f = 10 F/2.8 2ω = 186°
Ymax: 1.23 f; Total length: 6.30 f

| men | r | d | νd | n(d) |
|---|---|---|---|---|
| 1) | 16.28121 | 2.78533 | 64.119 | 1.5168000 |
| 2) | 12.25505 | 4.28942 | | 1.0000000 |
| 3) | 31.41000 | 1.76405 | 64.119 | 1.5168000 |
| 4) | 6.49952 | 2.43253 | | 1.0000000 |
| 5) | 25.95618 | 1.85689 | 60.293 | 1.6204100 |
| 6) | 5.01578 | 2.78533 | 32.110 | 1.6727000 |
| 7) | 10.75117 | 1.29982 | | 1.0000000 |
| 8) | 0.00000 | 0.37138 | | 1.0000000 |
| 9) | 26.92797 | 5.47783 | 65.472 | 1.6030000 |
| 10) | −10.67491 | 1.85689 | | 1.0000000 |
| 11) | −48.69488 | 1.85689 | 27.512 | 1.7552000 |
| 12) | 12.70241 | 11.51272 | 60.675 | 1.6031100 |
| 13) | −14.59100 | 0.37138 | | 1.0000000 |
| 14) | 15.99545 | 10.76996 | 64.119 | 1.5168000 |
| 15) | −57.70535 | 1.85689 | 25.432 | 1.8051800 |
| 16) | 297.24074 | 3.06517 | | 1.0000000 |
| 17) | 0.00000 | 6.75908 | 69.758 | 1.5489210 |
| 18) | 0.00000 | 1.87213 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −3.69167e−05 | −4.14089e−07 | 1.26352e−10 | 0.00000e+00 |

TABLE 10 f = 10 F/2.8 2ω = 187°
Ymax: 1.25 f; Total length: 6.20 f

| men | r | d | νd | n(d) |
|---|---|---|---|---|
| 1) | 16.23704 | 2.77778 | 64.103 | 1.5168000 |
| 2) | 12.22180 | 4.27778 | | 1.0000000 |
| 3) | 20.30813 | 1.75926 | 64.103 | 1.5168000 |
| 4) | 6.11802 | 2.42593 | | 1.0000000 |
| 5) | 53.01458 | 1.85185 | 60.140 | 1.6204090 |
| 6) | 5.30031 | 2.77778 | 32.170 | 1.6727000 |
| 7) | 11.74980 | 1.29630 | | 1.0000000 |
| 8) | 0.00000 | 0.37037 | | 1.0000000 |
| 9) | 27.21217 | 5.46296 | 65.416 | 1.6030010 |
| 10) | −10.59259 | 1.85185 | | 1.0000000 |
| 11) | −62.14782 | 1.85185 | 25.802 | 1.7847210 |
| 12) | 13.08554 | 11.48148 | 60.645 | 1.6031100 |

TABLE 10-continued f = 10 F/2.8 2ω = 187°
Ymax: 1.25 f; Total length: 6.20 f

| | | | | |
|---|---|---|---|---|
| 13) | −14.84907 | 0.37037 | | 1.0000000 |
| 14) | 16.38828 | 10.92593 | 64.103 | 1.5168000 |
| 15) | −90.11317 | 1.85185 | 25.346 | 1.8051820 |
| 16) | 272.40654 | 5.30459 | | 1.0000000 |
| 17) | 0.00000 | 1.85185 | 58.667 | 1.5280000 |
| 18) | 0.00000 | 1.38889 | 61.728 | 1.5000000 |
| 19) | 0.00000 | 1.83333 | | 1.0000000 |
| 20) | 0.00000 | 0.32160 | | 1.0000000 |

*** ASPHERICAL SURFACE DATA ***

| men | K | C2 | C4 | C6 | C8 | C10 |
|---|---|---|---|---|---|---|
| 1 | 1.0000 | 0.00000e+00 | −3.38015e−05 | −4.76512e−07 | 9.08827e−11 | 0.00000e+00 |

In the respective embodiments given above, it was possible to realize a lens suited to a foveal optical system with undiminished illuminance (a illuminance of about F2.8) all the way to the periphery and with high resolution over the entire field of view, and with which a wide field of view (over 180 degrees) and an extremely compact size can be attained with a single wide-angle optical system.

The invention claimed is:

1. A fisheye lens with an angle of incidence of at least 60 degrees, comprising a front group made up of a total of three groups, which are, in order from the object side, two concave lenses whose concave surfaces are directed toward the image side, and a compound lens whose concave surface is directed toward the image side and which has an overall convex or concave refractive power; and a rear group formed by three groups of convex lenses, wherein the front group includes at least one compound lens set, the rear group includes only one compound lens set, and at least a first surface of a first concave lens of the front group is an aspheric surface, and satisfies the following conditions:

(1) The aspheric first surface of the first concave lens of the front group either is expressed by the formula $X=G(Y)$, where the origin is the apex of the aspheric surface, X is the optical axis direction, and Y is a direction perpendicular to the optical axis (a positive value), or is expressed as a functional approximation by the formula $dx/dY>0$ within the range of $Y_{max}>Y>0.5f$, where $Y_{max}$ is the maximum value of the effective radius of the lens, and f is the focal distance of the lens system overall, (2) When the projection function of the lens is taken using $h=f*\sin\omega$ as a reference scale, the distortion aberration V when the incidence angle ω is 60 degrees is such that $-10\% \geq V \geq -16\%$. Here, $V=(H-h)*100/h$ (%), and H represents the height of the image from the optical axis when the incidence angle ω is 60 degrees.

2. The fisheye lens according to claim 1, wherein the above-mentioned G(Y) is expressed by the following formula:

[Mathematical Formula 1]

$$G(Y) = \frac{(1/R1)Y^2}{1+\sqrt{1-\kappa\left(\frac{Y}{R1}\right)^2}} + \sum_{i=1}^{N} K_i Y^{a_i}$$

The type of aspheric surface here is a rotational aspheric surface whose center of rotation is around the optical axis. Furthermore, R1 is the radius of curvature of the first surface of the first concave lens, κ and $K_i$ are constants, N is a natural number, and $a_i$ is an integer or a real number greater than 1.

3. The fisheye lens according to claim 2, wherein the above-mentioned G(Y) is expressed by the following formula:

[Mathematical Formula 2]

$$G(Y) = \frac{(1/R1)Y^2}{1+\sqrt{1-\kappa\left(\frac{Y}{R1}\right)^2}} + AY^4 + BY^6 + CY^8 + DY^{10} + EY^{12} + FY^{14}... \quad (1)$$

The type of aspheric surface here is a rotational aspheric surface whose center of rotation is around the optical axis. Furthermore, R1 is the radius of curvature of the first surface of the first concave lens, and κ, A, B, C, D, E, and F are constants.

4. The fisheye lens according to claim 1, wherein (3) and (4) below are satisfied:

(3) If we let the focal distance of the front group be fF, $-0.8f > fF > -1.5f$, (4) If we let the back focus on the front side of the rear group be BFr, $0 < BFr < 0.2f$.

5. The fisheye lens according to claim 4, wherein the second convex lens of the rear group is a cemented lens consisting of three lenses, which are convex, concave, and convex, in that order from the object side, and if we let f ou be the focal distance of the concave lens, the following relationship is satisfied:

(5) $-1.2f < f\text{ou} < -0.9f$.

6. The fisheye lens according to claim 1, wherein the second convex lens of the rear group is a cemented lens consisting of three lenses, which are convex, concave, and convex, in that order from the object side, and the compound concave lens in the middle is a lens made of a transmissive member with a higher refractive index and higher dispersion than the compound convex lens on the image side.

7. An imaging device that has the fisheye lens according to claim 1, has the function of acquiring an image with an electronic imaging device, further has at least one mechanism out of a pan mechanism, a tilt mechanism, and a rotation mechanism, and can be operated by electrical signals or dynamically.

8. An imaging device that has the fisheye lens according to claim 1, is equipped with an electronic imaging device, and further has the function of recording or storing at least one of a captured image, the time, the direction, and the device's own coordinates, the function of identifying a subject, and the function of directing a target close to the center of the field of view according to an internal or external signal.

9. An imaging device that makes use of a plurality of fisheye lenses having the same specifications as the fisheye lens according to claim 1, wherein parallax can be utilized to acquire distance information about at least a specific place.

10. An imaging device that makes use of a plurality of the fisheye lenses according to claim 1, wherein a multi-lens has a convergence mechanism.

11. A fisheye lens with an angle of incidence of at least 60 degrees, comprising a front group made up of a total of three groups, which are, in order from the object side, two concave lenses whose concave surfaces are directed toward the image side, and a compound lens whose concave surface is directed toward the image side and which has an overall convex or concave refractive power; and a rear group formed by three groups of convex lenses, wherein the front group includes at least one compound lens set, the rear group includes two or more compound lens sets, and at least a first surface of a first concave lens of the front group is an aspheric surface, and satisfies the following conditions:

(6) The aspheric first surface of the first concave lens of the front group either is expressed by the formula X=G(Y), where the origin is the apex of the aspheric surface, X is the optical axis direction, and Y is a direction perpendicular to the optical axis (a positive value), or is expressed as a functional approximation by the formula dx/dY>0 within the range of $Y_{max}$>Y>0.5f, where $Y_{max}$ is the maximum value of the effective radius of the lens, and f is the focal distance of the lens system overall, (7) When the projection function of the lens is taken using h=f*sin ω as a reference scale, the distortion aberration V when the incidence angle ω is 60 degrees is such that −10%≧V≧−16%, here, V=(H−h)*100/h (%), and H represents the height of the image from the optical axis when the incidence angle ω is 60 degrees.

12. The fisheye lens according to claim 11, wherein the above-mentioned G(Y) is expressed by the following formula:

[Mathematical Formula 3]

$$G(Y) = \frac{(1/R1)Y^2}{1 + \sqrt{1 - \kappa\left(\frac{Y}{R1}\right)^2}} + \sum_{i=1}^{N} K_i Y^{a_i}$$

The type of aspheric surface here is a rotational aspheric surface whose center of rotation is around the optical axis. Furthermore, R1 is the radius of curvature of the first surface of the first concave lens, κ and $K_i$ are constants, N is a natural number, and $a_i$ is an integer or a real number greater than 1.

13. The fisheye lens according to claim 12, wherein the above-mentioned G(Y) is expressed by the following formula:

[Mathematical Formula 4]

$$G(Y) = \frac{(1/R1)Y^2}{1 + \sqrt{1 - \kappa\left(\frac{Y}{R1}\right)^2}} + AY^4 + BY^6 + CY^8 + DY^{10} + EY^{12} + FY^{14}... \quad (2)$$

The type of aspheric surface here is a rotational aspheric surface whose center of rotation is around the optical axis. Furthermore, R1 is the radius of curvature of the first surface of the first concave lens, and κ, A, B, C, D, E, and F are constants.

14. The fisheye lens according to claim 11, wherein (8) and (9) below are satisfied:
(8) If we let the focal distance of the front group be fF, −0.8f>fF>−1.5f,
(9) The radius of curvature R of the compound surface of the second-group convex lens of the rear group is such that 1.0f<R<1.4f.

15. The fisheye lens according to claim 11, wherein the second convex lens of the rear group is a cemented lens consisting of two lenses, which are concave and convex, in that order from the object side, the concave lens is a lens made of a transmissive member with a higher refractive index and higher dispersion than the convex lens on the image side, and if we let f ou be the focal distance of the concave lens, then −1.5f<f ou<−0.8f.

16. The fisheye lens according to claim 11, wherein the third convex lens of the rear group is a cemented lens consisting of two lenses, which are convex and concave, in that order from the object side, and the concave lens is a lens made of a transmissive member with a higher refractive index and higher dispersion than the convex lens.

17. An imaging device that has the fisheye lens according to claim 11, has the function of acquiring an image with an electronic imaging device, further has at least one mechanism out of a pan mechanism, a tilt mechanism, and a rotation mechanism, and can be operated by electrical signals or by dynamic means.

18. An imaging device that has the fisheye lens according to claim 11, is equipped with an electronic imaging device, and further has the function of recording or storing at least one of a captured image, the time, the direction, and the device's own coordinates, the function of identifying a subject, and the function of directing a target close to the center of the field of view according to an internal or external signal.

19. An imaging device that makes use of a plurality of fisheye lenses having the same specifications as the fisheye lens according to claim 11, wherein parallax can be utilized to acquire distance information about at least a specific place.

20. An imaging device that makes use of a plurality of the fisheye lenses according to claim 11, wherein a multi-lens has a convergence mechanism.

* * * * *